Dec. 27, 1955    B. S. BENSON ET AL    2,728,521
APPARATUS FOR TYPING SYMBOLS FROM A REGISTER
Filed April 11, 1952    10 Sheets-Sheet 1
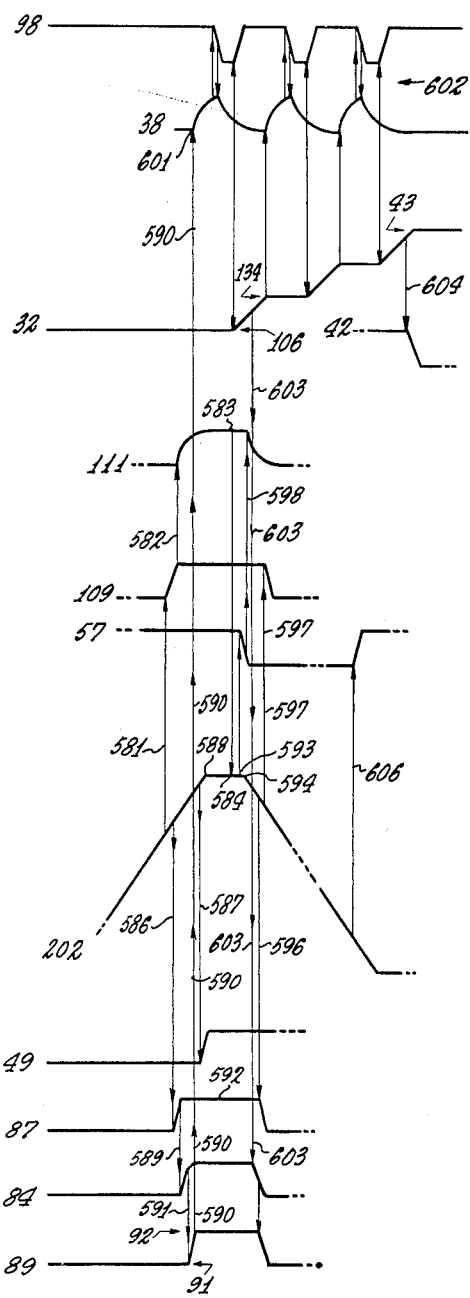
Fig. 2c.
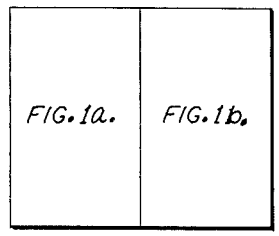
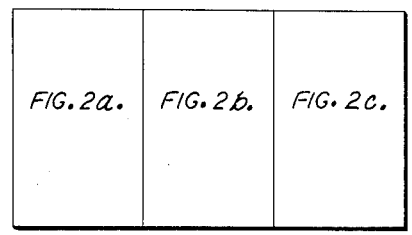
BERNARD S. BENSON,
HAROLD J. ROUNDS, JR.,
LAWRENCE W. DANENBERG &
MICHAEL J. MARKAKIS,
              INVENTORS.
HUEBNER, BEEHLER,
WORREL & HERZIG.
            ATTORNEYS.
BY
Warren T. Jessup

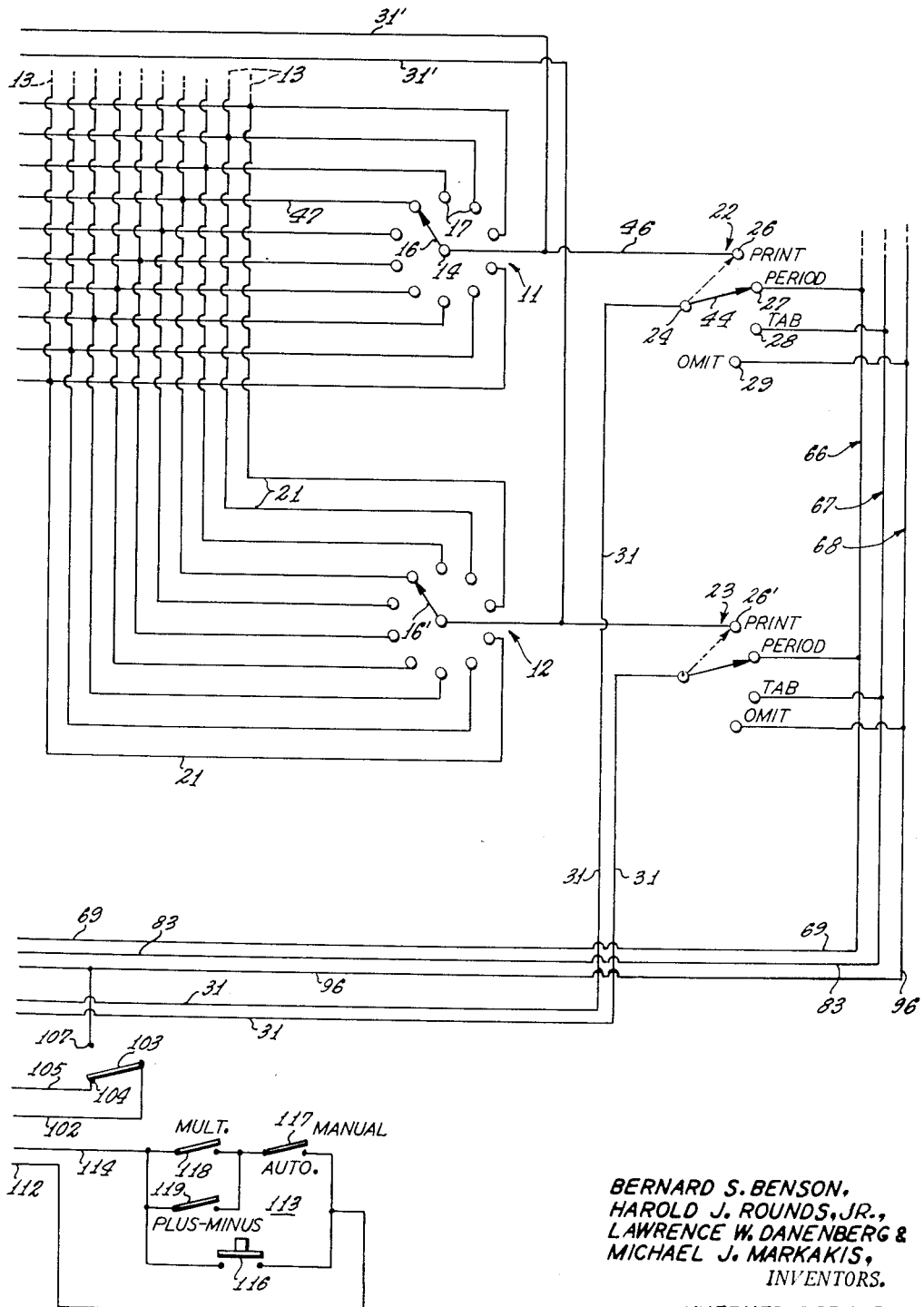

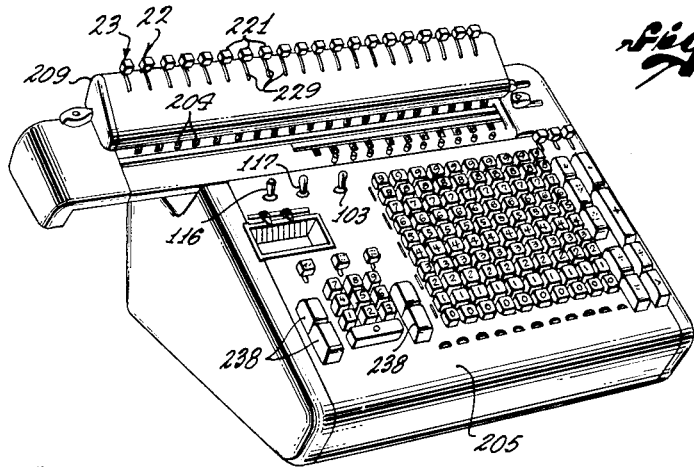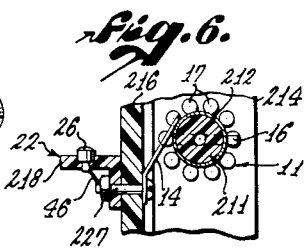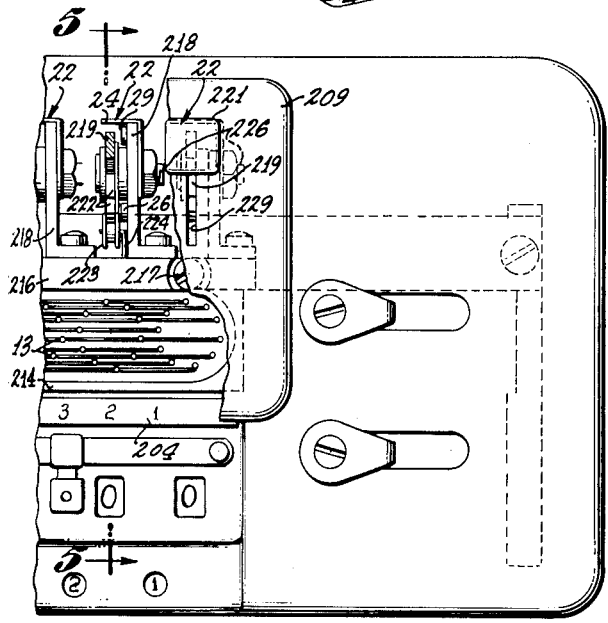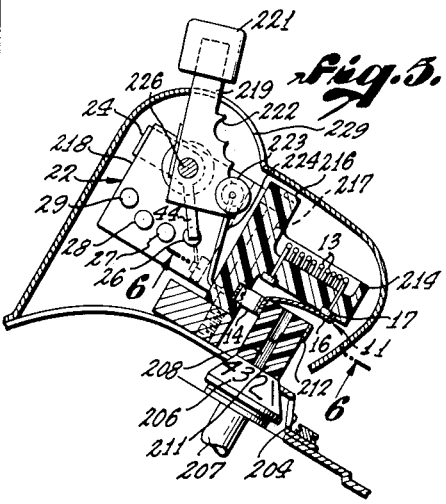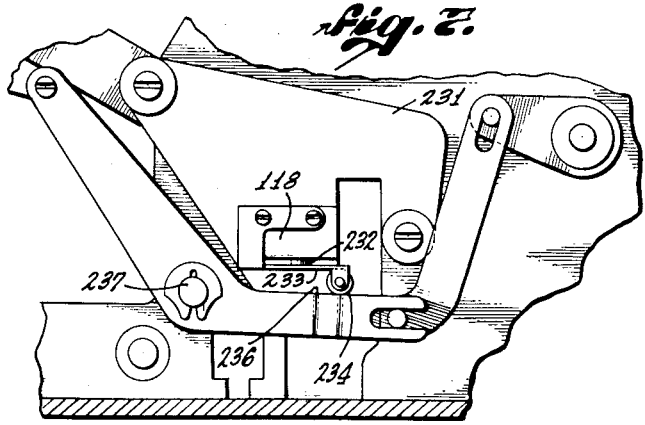
BERNARD S. BENSON,
HAROLD J. ROUNDS, JR.,
LAWRENCE W. DANENBERG &
MICHAEL J. MARKAKIS,
INVENTORS.
HUEBNER, BEEHLER,
WORREL & HERZIG,
ATTORNEYS.
BY
Warren T. Jessup

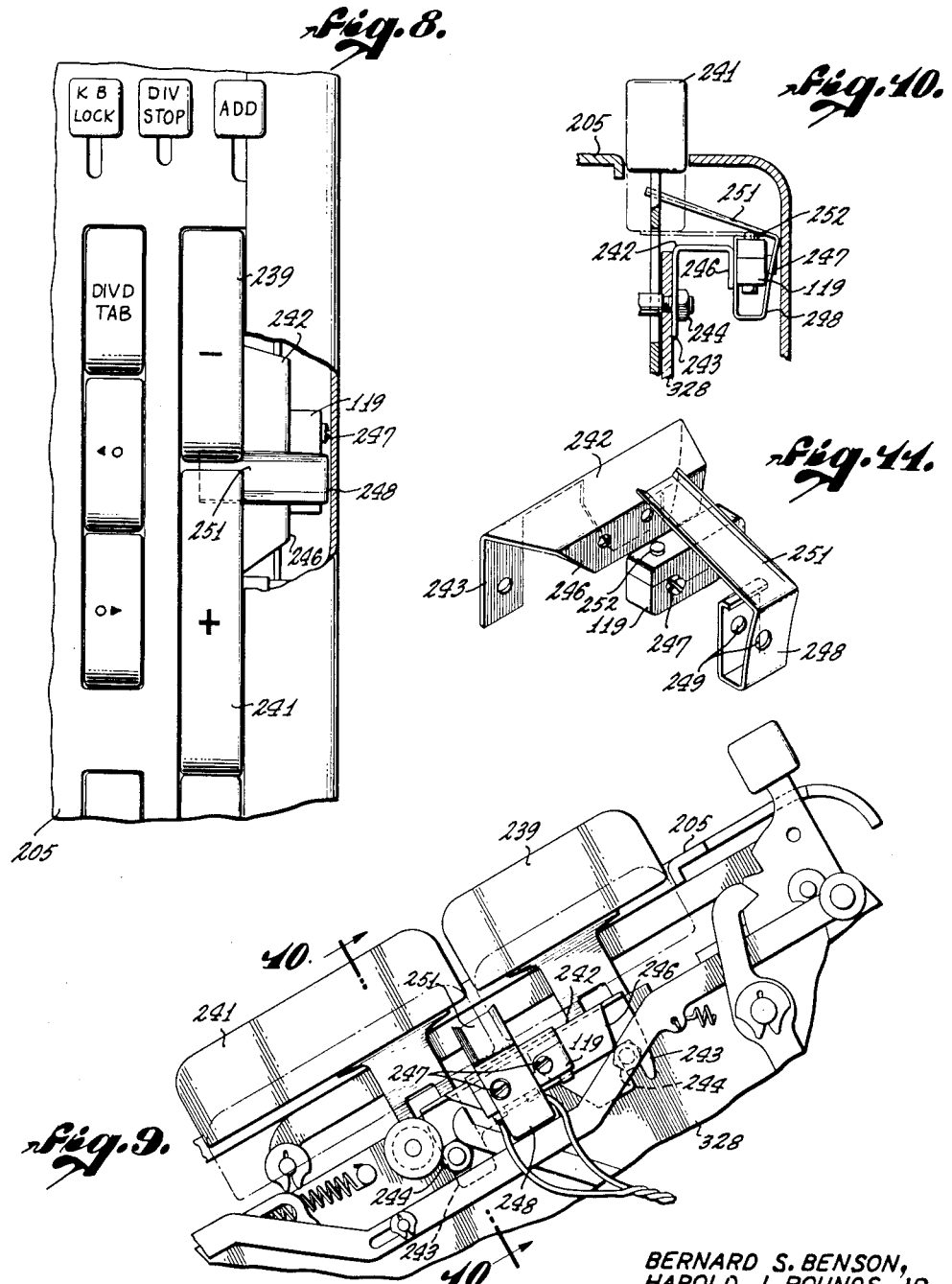

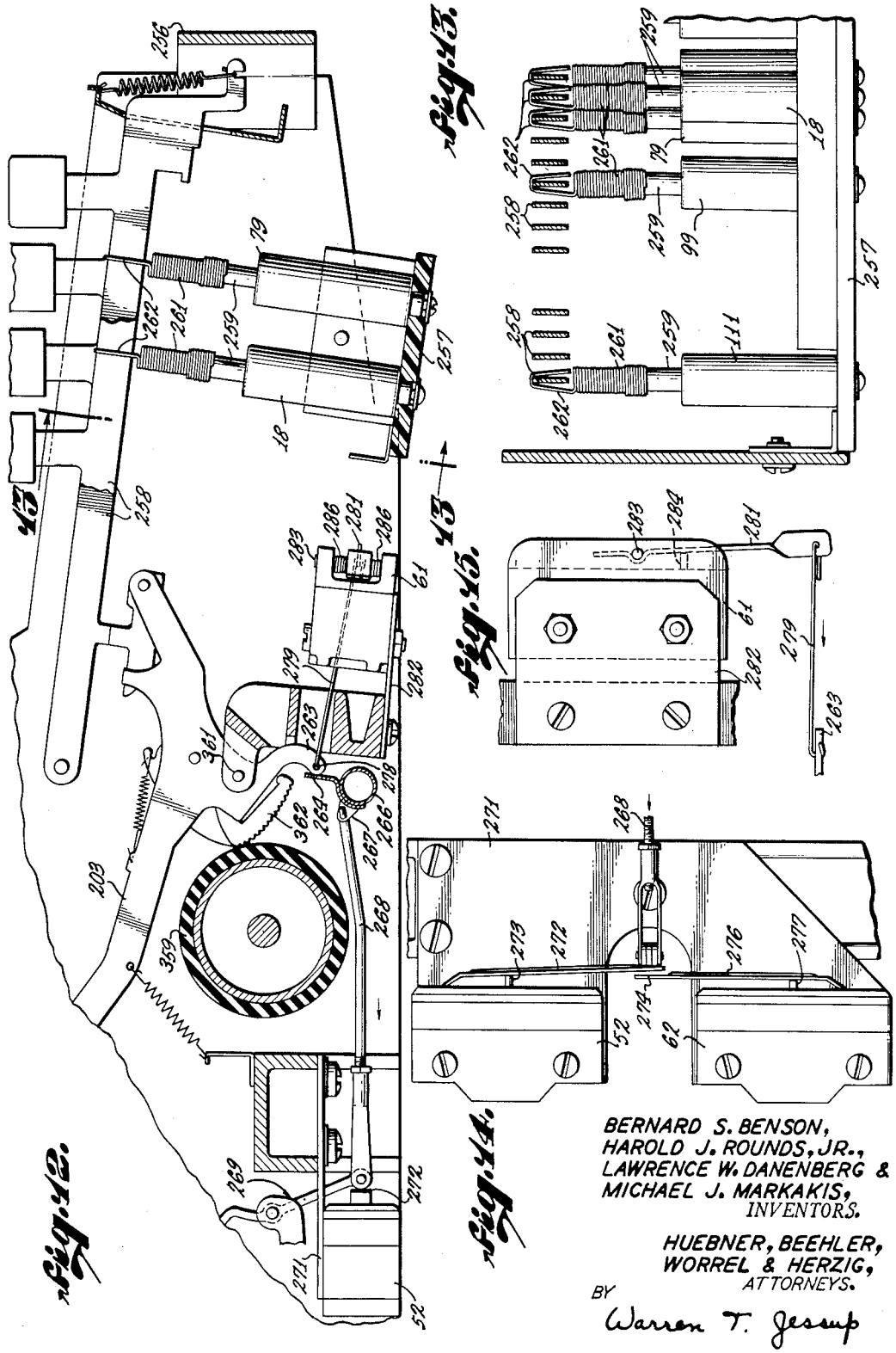

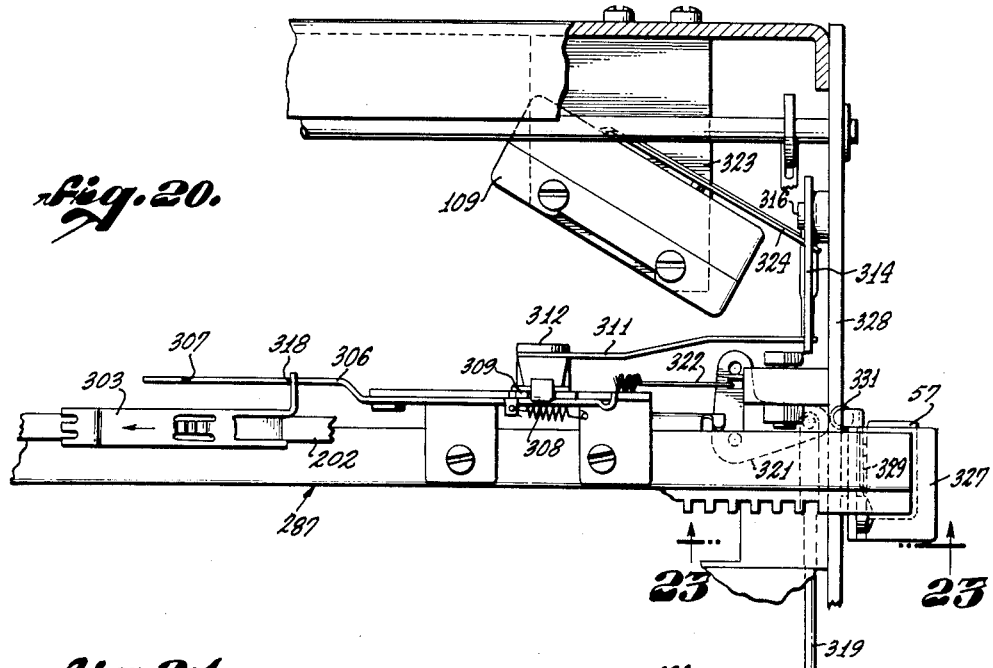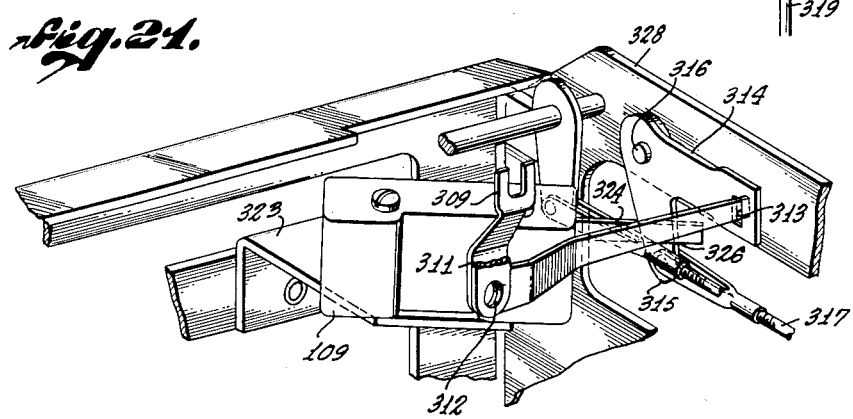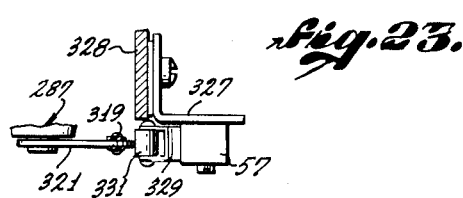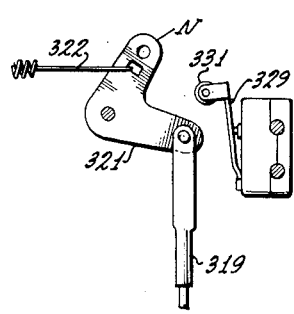

Dec. 27, 1955   B. S. BENSON ET AL   2,728,521
APPARATUS FOR TYPING SYMBOLS FROM A REGISTER
Filed April 11, 1952   10 Sheets—Sheet 10
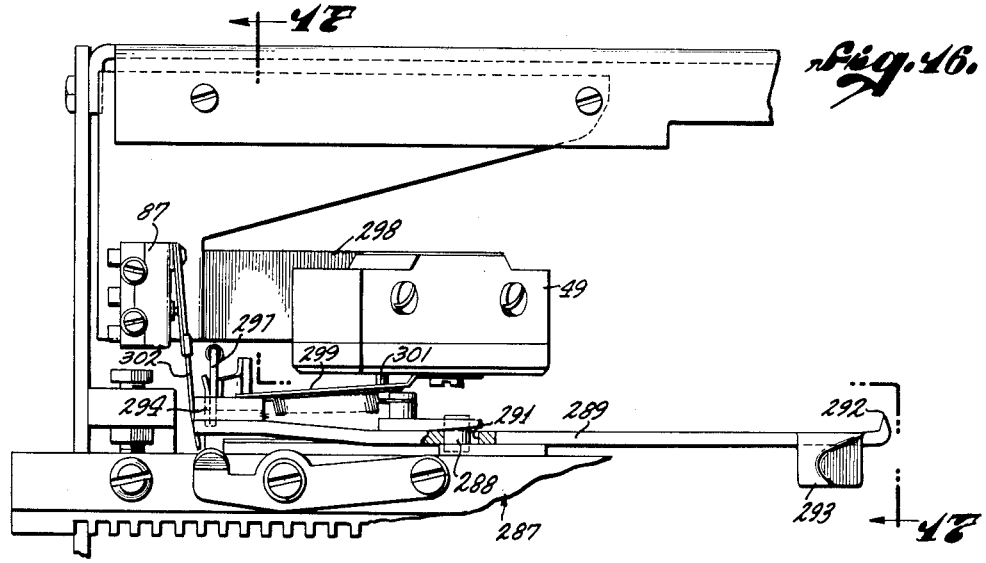
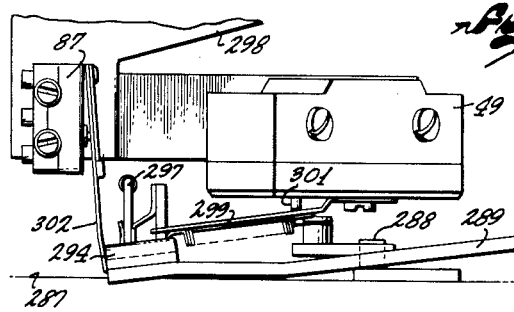
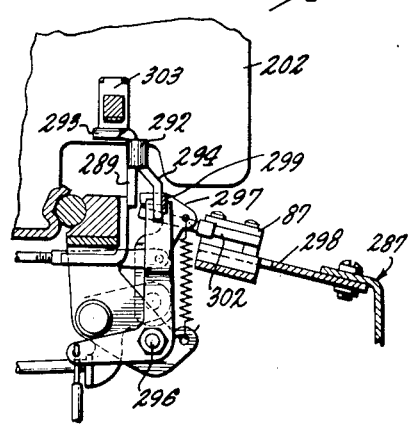
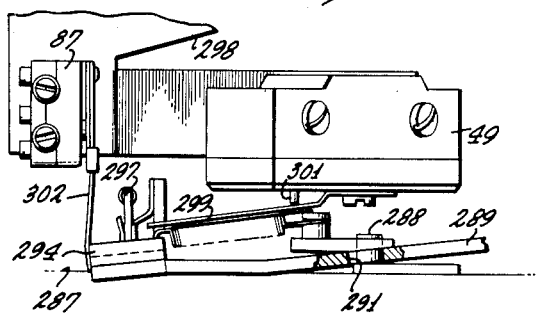
BERNARD S. BENSON,
HAROLD J. ROUNDS, JR.,
LAWRENCE W. DANENBERG &
MICHAEL J. MARKAKIS,
INVENTORS.
HUEBNER, BEEHLER,
WORREL & HERZIG,
ATTORNEYS.
BY
Warren T. Jessup United States Patent Office 2,728,521
Patented Dec. 27, 1955

2,728,521

APPARATUS FOR TYPING SYMBOLS FROM A REGISTER

Bernard S. Benson, Malibu, Michael J. Markakis, Los Angeles, Lawrence W. Danenberg, Pacific Palisades, and Harold J. Rounds, Jr., Canoga Park, Calif., assignors, by mesne assignments, to Friden Calculating Machine Co., Inc., a corporation of California Application April 11, 1952, Serial No. 281,882

19 Claims. (Cl. 235—60.4)

This invention relates to electrical apparatus for causing a typewriter to type symbols from a registering machine. The invention is especially adapted, although not limited, to the actuation of a typewriter to cause it automatically to type the registered numbers from a calculating machine after a calculation has been completed. The invention also relates to the combination of a registering machine, a typewriter, and electric circuit means for causing the typewriter to automatically type the symbols appearing on the registers of the registering machine.

It is an object of this invention to provide improved and compact electrical means by means of which a typewriter and a registering machine may be connected together so that the typewriter will automatically type the symbols appearing on the registering machine.

It is another object of this invention to provide apparatus as described above, in which the typing of the registered symbols is done as rapidly as the typewriter can be actuated, thereby minimizing the typing out time required to record the registered symbols.

It is another object of this invention to provide rapid typing out as above described, while at the same time insuring that the typewriter is never driven at a speed faster than that to which it can properly respond.

It is another object of this invention to provide typing out apparatus as above described, wherein punctuation, as for example, a period, may be interjected between any adjacent pair of symbols. In this way a decimal point may be inserted when the symbols constitute numbers on a calculating machine.

It is a further object of this invention to provide apparatus as above described, in which spaces of adjustable width may be interjected between any pair of adjacent symbols or numerals, thereby permitting the symbols, as for example, numerals on a calculating machine to be typed off in the form of spaced columns.

It is a further object of this invention to provide means for automatically returning the typewriter carriage when it has reached the end of its run, thereby readying it to receive another set of registered symbols.

It is a further object of this invention to provide means for automatically inserting a predetermined code symbol, as for example, a minus sign, after any line of typed symbols or numerals.

It is a further object of this invention to provide an apparatus as above described, in which the typing out operation is effected automatically and without delay as soon as the registering machine has completed the setting of its registers.

It is an additional object of this invention to provide safety means whereby the typewriter is precluded from continuing to type out during a return run of the carriage, in the event the operator should erroneously set up an inconsistent programming of the apparatus.

It is a further object of this invention to produce a combination of a typewriter, a registering machine, and means for effecting the above objects, whereby the typewriter types out the symbols appearing at the registers of the registering machine.

It is a further object of this invention to provide such a typing-out apparatus as described above, wherein the incorporation of such apparatus does not disable the typewriter for normal use, but which is so arranged that the typewriter is ready at all times to accept conventional manual operation whenever desired.

In accordance with these and other objects which will become apparent through perusal of the ensuing specification and claims, a preferred embodiment of the instant invention will now be described with reference to the accompanying drawings wherein:

Figs. 1a and 1b are a circuit diagram showing schematically the apparatus of the instant invention.

Fig. 1 is a diagram showing the correlation between Figs. 1a and 1b.

Figure 2A:
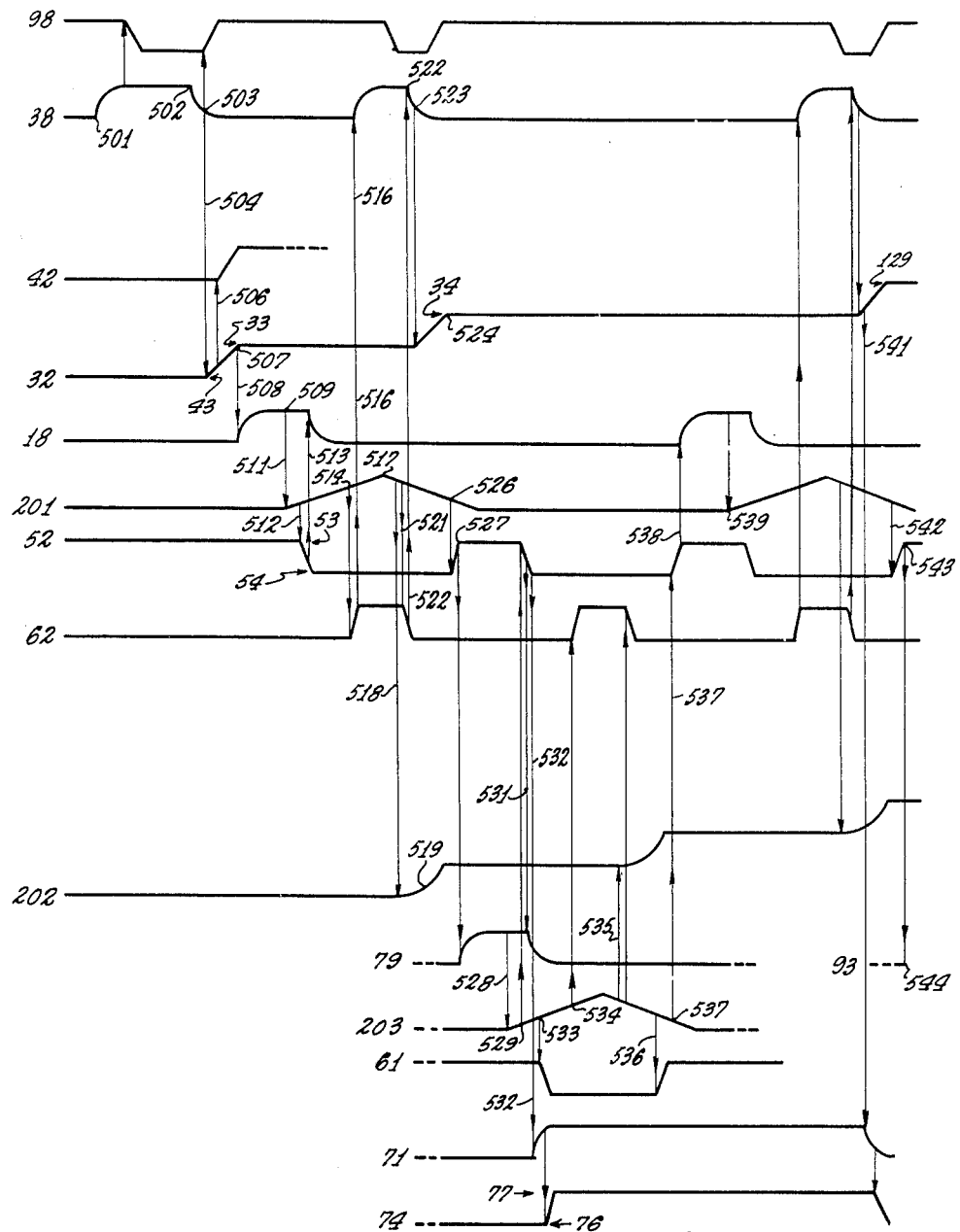
Figure 2B:
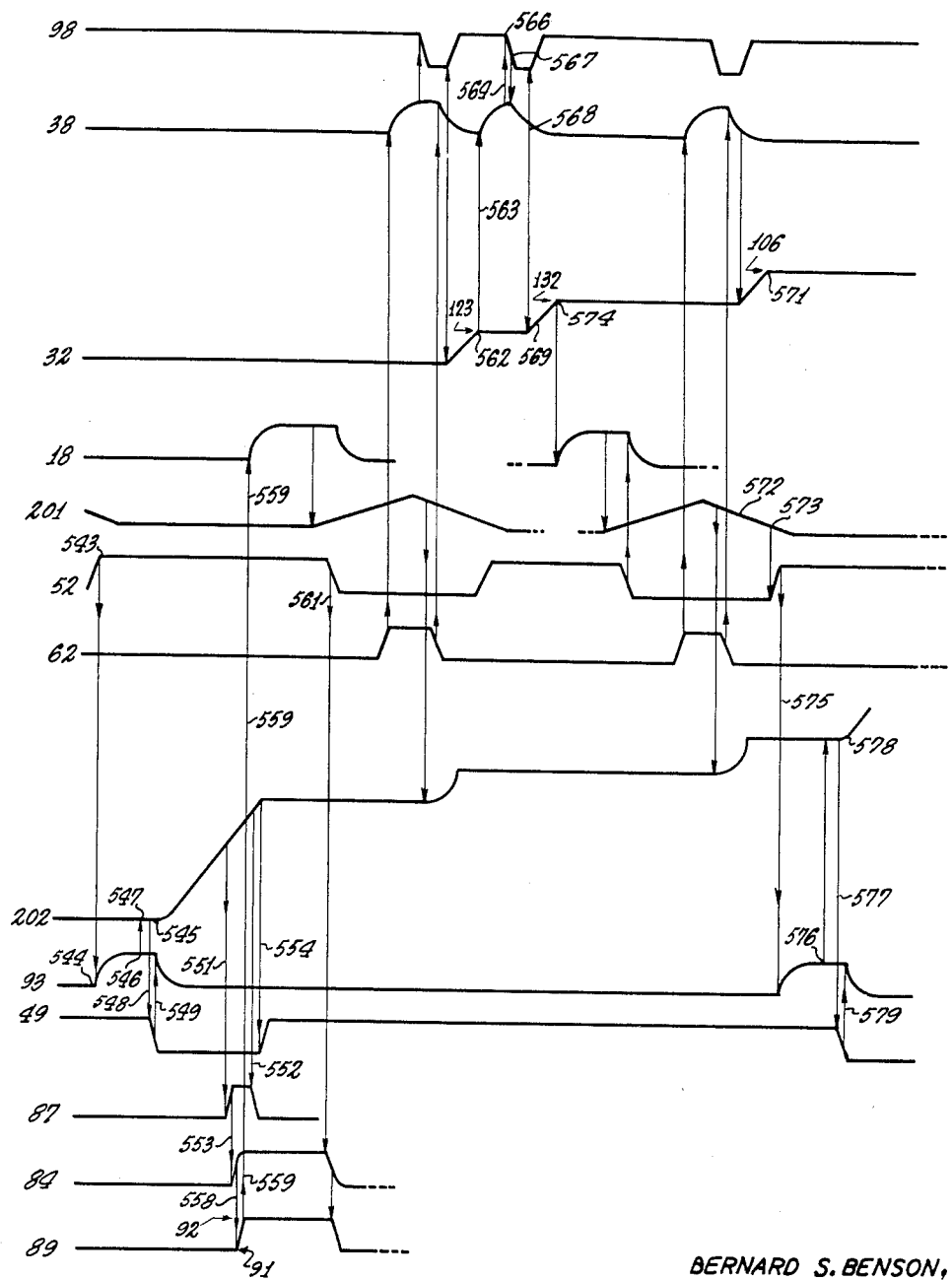

Figs. 2a, 2b, and 2c are charts illustrating the time correlation in operation among the various elements of the apparatus.

Fig. 2 is a diagram showing the correlation among Figs. 2a, 2b, and 2c.

Fig. 3 is a perspective view of a calculating machine or calculator to which the instant invention is adaptable.

Figure 4A:
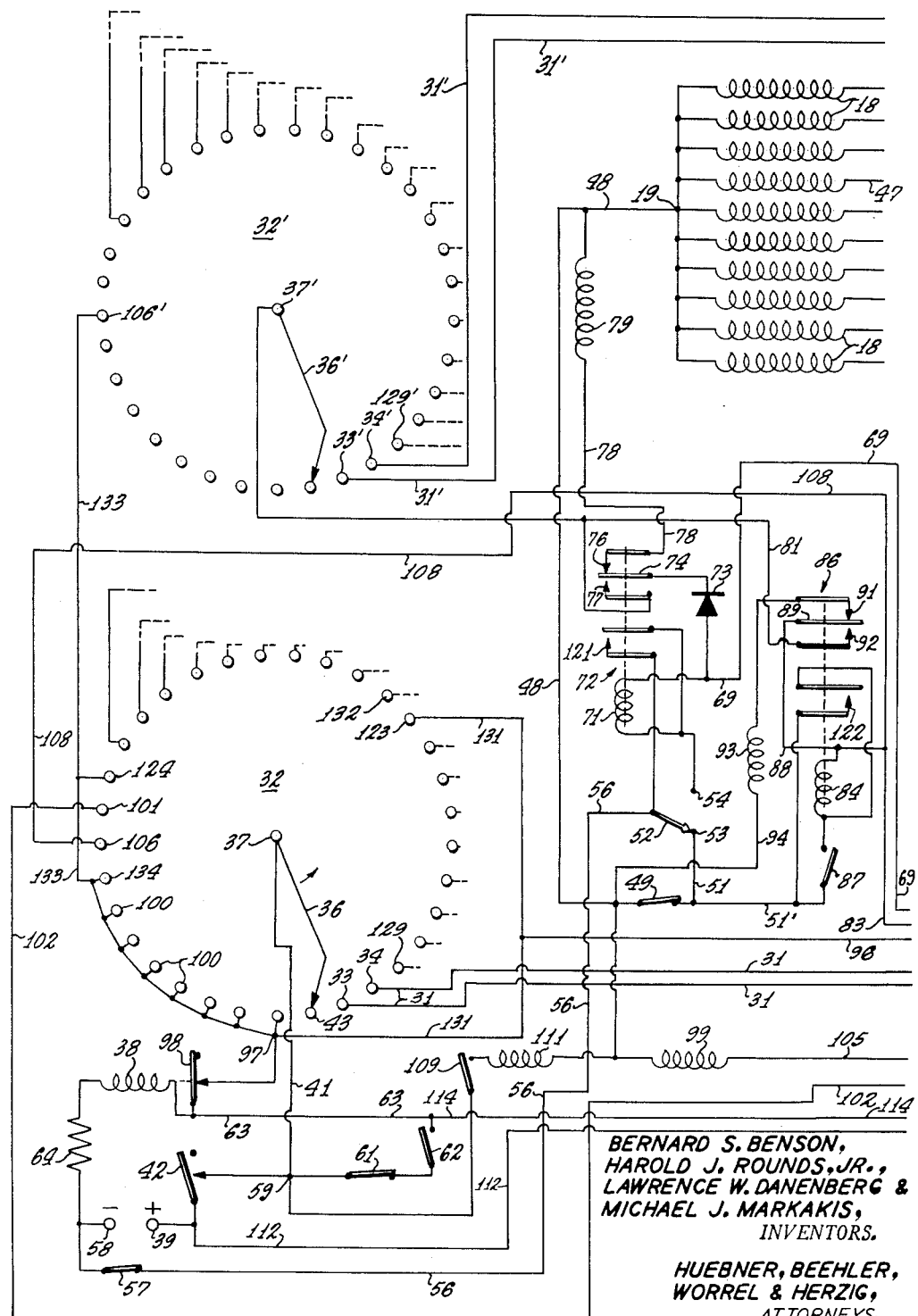

Fig. 4 is a fragmentary view looking down on the right-hand end of the calculating machine carriage, with a portion of the carriage cover broken away.

Fig. 5 is a cross-section taken on line 5—5 of Fig. 4.

Fig. 6 is a fragmentary section taken on line 6—6 of Fig. 5.

Fig. 7 is a fragmentary view looking at a portion of the left-hand side of the calculator shown in Fig. 3, with the calculator wall removed.

Fig. 8 is a fragmentary view looking down at the right-hand edge of the calculator panel shown in Fig. 3.

Fig. 9 is a view looking to the right in Fig. 8, with the wall or cover removed to show the interior.

Fig. 10 is a section taken on line 10—10 of Fig. 9.

Fig. 11 is an exploded perspective view showing certain parts which are added to the calculating machine in accordance with the instant invention.

Fig. 12 is a fragmentary elevational section looking into a typewriter from the left side thereof.

Fig. 13 is a section taken on line 13—13 of Fig. 12.

Fig. 14 is a fragmentary view looking at portions of the under side of the typewriter.

Fig. 15 is another fragmentary view looking at another portion of the under side of the typewriter.

Fig. 16 is a top plan view showing the left rear corner of the typewriter frame, modified in accordance with the instant invention.

Fig. 17 is a cross-section taken on line 17—17 of Fig. 16.

Figs. 18 and 19 are views similar to Fig. 16, showing the apparatus in different positions of operation.

Fig. 20 is a fragmentary top plan view looking down on the right rear corner of the typewriter frame.

Fig. 21 is a perspective view of some of the elements shown in Fig. 20.

Fig. 22 is a partial plan view somewhat similar to Fig. 20, and showing the elements in a different position of operation.

Fig. 23 is a sectional elevation taken on line 23—23 of Fig. 20.

In the development of this invention it has been found possible to eliminate all separate ancillary chassis and to mount all of the elements of the read off or type out apparatus, onto either the typewriter or the registering machine. Fig. 1a represents those elements of the instant invention which are preferably mounted to the typewriter, and Fig. 1b illustrates those elements which are preferably mounted to the registering machine.

Inasmuch as the instant invention has particular application to an electrically powered typewriter and to a numerical calculating machine capable of adding, subtracting, multiplying, and dividing, the following description will be based on such machines, although it is to be understood that the invention in general has application to many types of typewriters and to many types of registering machines.

This invention will be described as applied to a calculating machine having a plurality of, for example twenty, substantially identical ordinally arranged register elements, each of which carries a plurality of, for example ten, symbols—in this case the ten digits of the Arabic number system, 0 through 9. As is well known, each of the twenty ordinally arranged register elements may be positioned so as to indicate, en toto, any number from 0 to 99, 999, 999, 999, 999, 999, 999. It is the purpose of the instant invention to provide for the automatic typing, by the typewriter, of any number appearing on the calculating machine; for the insertion of a decimal point where desired; and for the interjection of spaces in the numbers at any desired points, so that columns of figures may be typed if desired. This latter is accomplished by appropriate actuation of the typewriter tabulator key in a manner to be described hereinafter.

Referring to Fig. 1b, there are shown a plurality of multi contact distributor switches 11 and 12, these being but two of twenty of such switches, each of which is linked mechanically to a respective register element of the calculating machine. As shown by the dotted lines 13, eighteen other distributor switches (not shown) are connected in a way similar to that shown for the switches 11 and 12. Each of the distributor switches is substantially identical, and an exemplary description will be made only of the switch 11. This switch comprises a first or common terminal 14 having a conducting distributing arm 16, which selectively connects the terminal 14 to any one of the ten other terminals 17. Each of the terminals 17 corresponds respectively to one of the ten digits, 0 through 9. The distributor arm 16 is linked to the particular register element to which the switch 11 corresponds; in this case the arm 16 is directly connected to the register element shaft as will be described more particularly hereinafter.

Mounted to the typewriter are a plurality of actuators in the form of solenoids 18. Each solenoid controls a magnetic plunger which in turn is connected to the lever carrying one of the finger buttons or tabs of the typewriter, so as to actuate selectively any of the number type keys 0 through 9. One terminal of each of the solenoids 18 is connected to a common point 19, while the other side is connected, respectively, to one of the terminals 17 of the distribution switch 11. All of the terminals 17 of the twenty distribution switches 11, 12, etc. corresponding to a given numeral are connected together and to the respective solenoids 18, as shown by the ten interconnecting leads illustrated at 21 and at 13, previously mentioned. Thus when a circuit is completed to any one of the common terminals 14, a particular solenoid 18 will be energized to cause typing of the corresponding numeral, depending on the setting of the arm 16 of that particular distributor switch.

Each of the distributor switches 11, 12 has associated therewith a multi contact function switch, as shown at 22 and 23. The function switches 22, 23 are likewise mounted to the calculating machine, preferably immediately above the distribution switches 11—12. Each function switch, for example, the switch 22, has a common terminal 24 and a plurality of other terminals 26, 27, 28, and 29. The common terminal 14 of the distribution switch 11 is connected to the first of these terminals 26. The common terminal 24 of the function switch 22 is connected by a lead 31 to one of the terminals of a multi contact stepping switch 32 mounted to the typewriter and illustrated in Fig. 1a. There are twenty such leads or connections 31, each connecting a respective function switch 22, 23 to an individual one of the contacts 33, 34 of the stepping switch 32.

The stepping switch 32 has at least twenty positions and contacts, and in the illustrated embodiment actually has many more which are not used. Switch 32 is a standard item, the details of which form no part of the instant invention. Its operation will be described in detail, however, in order to assist in a full understanding of the present invention. The switch 32 has a distribution arm 36 connected to a common terminal 37. The arm 36 is actuated step by step by a solenoid 38, each step carrying the arm 36 counter-clockwise successively around to the next contact 33, 34. When the solenoid 38 is energized, its armature is retracted, cocking the switch against the bias of a return spring. The arm 36 is not moved, however, until the solenoid 38 is de-energized, allowing the solenoid plunger to be returned by the return spring, and simultaneously stepping the arm 36 one step to the next contact. Thus each discrete energization pulse applied to the stepping means or solenoid 38 causes the switch 32 to step once; the switch being cocked by the onset of the energization of the pulse. The common terminal 37 is connected to one side of a source of potential, preferably the positive side of a D. C. source shown at 39, through a lead 41. In this connection there is interposed a switch 42 forming a part of the stepping switch 32. The switch 42 is positioned to be automatically opened whenever the arm 36 is in the "home" or quiescent position, at which time arm 36 rests on the contact 43; at all other positions of the arm 36 the switch 42 is closed. The stepping switch 32 also incorporates another switch 98, which will be described hereinafter.

Thus it is seen that the first circuit, through which the numeral solenoids 18 are energized, starts at the terminal 39, then proceeds through the switch 42, point 59, lead 41, terminal 37, to the arm 36. Assume, for example, that the arm 36 is resting momentarily on the contact 34. The circuit then continues from the arm 36 through the contact 34, one of the leads 31, to the terminal 24 of the appropriate function switch, in this case the switch 22. Assume further that the arm 44 of the switch 22 is moved to contact the terminal 26, which is known as the "Print" terminal, because in this position of the function switch the numeral appearing at the register is simply printed by the typewriter without the interjection of a period or of a tabulated space, which will be described hereinafter. The circuit then continues from the terminal 26 through the lead 46 to the terminal 14, thence through the arm 16 of the corresponding distributor switch to whichever of the terminals 17 the arm 16 has been positioned by the particular register element of the calculating machine. The circuit then proceeds through one of the conductors 47 of the multi conductor cable between the typewriter and the calculator, to the corresponding number solenoid 18 on the typewriter and thence to the common terminal 19. Thence the circuit is followed through the lead 48, tabulator switch 49, to be described hereinafter, lead 51, and then through a double throw "key" switch 52, so called because it is actuated from the contact 53 to the contact 54 and back, with each stroke of any typewriter key. From the switch 52 the first circuit is completed through a lead 56 and a carriage return safety switch 57 to the negative terminal 58 of the potential source. It is through this first circuit, above described, that the twenty registers of the calculator are sampled by the stepping switch 32, so that the typewriter is caused to type successively numerals corresponding to the numerals appearing at the twenty registers.

A second circuit is provided to effect automatic stepping of the switch 32. This circuit has a number of alternative paths, the fundamental one of which may be described as starting at the terminal 39, proceeding through the home switch 42, lead 59, period switch 61, impulse switch 62, lead 63, solenoid 38, ballast resistor 64, and back to the negative terminal 58.

The switch 62 is one of a number of microswitches mounted to the typewriter and disposed at strategic positions in order to be actuated at the proper times by the operation of the typewriter. Microswitches are characterized by the fact that they snap open or closed in response to a very small motion on the part of the switch impelling member. The switch 62 is so mounted on the typewriter that it is caused to close and then open with each stroke of any typewriter key. More specifically, as any typewriter key moves forward in its typing stroke, a point is reached where the microswitch 62 is caused to close. The type key then proceeds forward, strikes the platen and drops back or retracts. As the key drops back, and at approximately the same point where the microswitch 62 closed in its forward stroke, the microswitch 62 opens. Thus with each key stroke an impulse of energy is applied to the stepping switch stepping means, or solenoid, 38. Onset of the energy pulse cocks the stepping switch 32, and when the solenoid 38 is de-energized the switch arm 36 steps over to the next contact.

The above two described circuits are the fundamental circuits of this apparatus. The second described circuit causes the stepping switch to automatically step around and thus sample each of the twenty distributor switches 11, 12, such stepping being actuated by the typewriter keys, while the first circuit constitutes the sampling circuit including the contacts of the stepping switch, the distributor switches, and the number solenoids 18.

Interposed in the first circuit is the key switch 52, which is mounted to the typewriter and actuated by generally the same linkage that actuates the switch 62. Switch 52 is likewise a microswitch, but is a double throw instead of a single throw switch. In quiescent state the switch 52 is in the position 53. As any typewriter key makes a stroke, the switch 52 is actuated to the position 54. This occurs in the key stroke before the switch 62 is closed. After striking the platen, the key drops back, opening the switch 62 before the switch 52 is returned to the position 53.

The switch 52 performs a number of functions in the circuit, one of which is to preclude requiring the stepping switch 32 to break the current in the solenoids 18. If it were not for the switch 52, it is readily seen that the stepping of the switch 32 would effect breaking of the first circuit, when the arm 36 departs from one of the contacts 33, 34, thus subjecting these contacts to considerable arcing wear. The stepping switch is a relatively expensive item, and good design requires that arcing at its contacts be minimized. By causing the switch 52 to break the current in the solenoids 18, it is the microswitch 52 that is subjected to the arcing. This is a relatively inexpensive switch, compared to the stepping switch 32, and may be easily replaced, if necessary. Furthermore, movement of the switch 52 to its position 53 determines the point at which the next key solenoid will be energized, thereby insuring that one key will have come to rest before the next key starts its stroke.

As mentioned hereinbefore, it is sometimes desirable to do more than merely type off the registered numbers from the calculator. It may be desirable to insert a decimal point between certain of the numbers. This is done by proper positioning of the appropriate function switch 22, 23. Let it be assumed that it is desired to insert a decimal point before the numeral appearing at the ordinally arranged register element linked to the distributor switch 11. This is done by positioning the corresponding function switch, in this case the switch 22, to the "Period" position, which is the contact or terminal 27.

Such positioning alters appreciably the nature of the above mentioned first circuit. The circuit, starting at the positive terminal 39, includes, as before, the elements 42, 41, 37, 36, 34, 31, and 24. Now, however, instead of going to the print terminal 26, it is diverted to the period circuit 66, which is one of three function circuits 66, 67, or 68. The lead 66 is connected to the second, or period, terminal of each of the twenty function switches 22, 23, and thence by a lead 69 to the actuator or coil 71 of a period relay 72. The other side of the relay coil 71 is connected to the contact 54 of the key switch 52, the circuit then being completed as before, through the lead 56, switch 57, and back to the negative terminal 58.

A parallel circuit also branches from the lead 69, going through a back-circuit-preventing rectifier 73 to the arm 74 of a double throw switch forming a part of the relay 72. This switch has two contacts 76 and 77, one of which is open when the other is closed, and vice versa. The normal position, that is, when coil 71 is de-energized, is with the contact 76 closed and the contact 77 open. The circuit from the contact 76 proceeds through a conductor 78 to a period actuator or solenoid 79. This solenoid is mounted to the typewriter and linked to the lever which actuates the period key of the typewriter. From the period solenoid 79 the circuit is completed through the elements 48, 49, 51, 53, 52, 56, 57, to the negative terminal 58.

The switch arm 74 of the relay 72 represents a still further point of branching of the circuit, namely, to the contact 77. This circuit, starting at the contact 77, includes the conductor 81 and the terminal 37' of a second bank 32' of the stepping switch 32. This second bank is physically substantially identical with the first bank 32 and includes an arm 36' driven by the same shaft as, and stepped in synchronism with, the arm 36. Electrically it is completely independent, as shown. Twenty of the contacts 33', 34' of the second bank 32' are connected to the same respective numeral circuits as are their corresponding contacts 33, 34 on the main bank 32 of the switch. Instead of being connected to the common terminals 24 of the function switches, however, they are connected directly to the common terminals 14 of the distributor switches 11 through conductors 31'. This second bank 32' is needed in order to re-define the particular register that is being sampled by the stepping switch 32, after the decimal point has been typed, as will be explained more fully hereinafter. Proceeding with the second bank circuit, from the terminal 37', the circuit proceeds through the arm 36', one of the terminals 33', 34', one of the leads 31', to the corresponding distributor switch, for example, the switch 11. From the common terminal 14 of the distributor switch the circuit proceeds as before to the negative terminal 58, namely, through the elements 16, 17, 47, 18, 19, 48, 49, 51, 53, 52, 56, and 57.

As will be explained more fully hereinafter the decimal point or period is introduced before the typing of the numeral appearing at the pre-selected register. For example, if the function switch 22 is set to the period position 27 and the corresponding distributor switch 11 is positioned by its register to the numeral 3, then when the stepping switch reaches that particular register circuit, a period is first caused to be typed and then the numeral 3 solenoid 18 is actuated through the second bank 32'.

Since the typing of the period involves the stroke of a typewriter key, it actuates the impulse switch 62 which, as noted above, is responsive to each stroke of any typewriter key. Means must therefore be provided for preventing the switch 32 from stepping during the typing of the period, for otherwise the numeral at that register would be skipped over entirely. This means takes the form of a period switch 61, which, like the switches 52 and 62, is a micro switch. Switch 61 is mounted to the typewriter and so linked that it is responsive to a stroke of only the period key and to no other key. In quiescent position the switch 61 is closed. Upon a stroke of the period key the switch 61 is opened, and as the key retracts from its stroke the switch 61 is closed. Opening of this switch occurs before closing of the all-key switch 62 and closing of the switch 61 occurs after opening of the switch 62. Thus during the typing of a period by the type-off apparatus of this invention, the above mentioned second circuit, or stepping switch actuating circuit, is kept open at all times either by the switch 61 or the switch 62. The stepping switch 32 is therefore prevented from stepping when a period is typed.

As mentioned hereinbefore, it is often desirable instead of typing off the registered numbers in an unbroken line, to space them into columns. For this purpose the tabulator key of the typewriter is employed; and the circuit is so arranged that before the typing of any number, the typewriter carriage may be caused to tabulate over to any setting desired.

To achieve this result the function switch corresponding to the register before which the tabulation is desired is moved to the "Tabulate" position 28. In this position the circuit from the lead 31 is diverted to the second circuit 67 of the three ancillary circuits, and thence by a lead 83 to the actuator or coil 84 of a tabulator relay 86. From the coil 84 the circuit to the negative terminal 58 is completed through a tabulator pickup switch 87, conductor 51', conductor 51 and thence through the elements 53, 52, 56, and 57.

The switch 87 is a microswitch which is normally open. It is mounted to the typewriter in position to be closed momentarily as a tabulating run of the typewriter carriage is completed. That is to say, just before a tabulating run ends the switch 87 is closed and then quickly reopened as the tabulating run of the carriage terminates. This causes the relay 86 to pick up, as will be explained hereinafter.

The tabulator circuit from the lead 83, like the period circuit, branches at the relay coil, the second branch proceeding through the lead 88 to the switch arm 89 of a double throw switch forming part of the relay 86. This switch has contacts 91 and 92, the former being normally closed and the latter normally open. The contact 91 is connected to a tabulator actuator or solenoid 93, which is returned to the negative terminal 58 through the lead 94 and the elements 49, 51, 53, 52, 56, and 57.

When the relay coil 84 is energized so as to draw the arm 89 to the position 92, a third branch circuit is completed through the appropriate number solenoid 18 by way of the lead 81 and the second bank 32' of the stepping switch, in the same manner as explained in connection with the period circuit.

When the stepping switch 32 moves into position to sample one of the function switches 22, 23 which is set to the "Tabulate" position 28, the operation is substantially as follows: The tabulator solenoid 93 is energized, starting the typewriter carriage on a tabulating run. Toward the close of the run the coil 84 is energized by the closing of the switch 87, diverting the current, which energizes the lead 81 and completes the ancillary circuit through the second bank 32' and the appropriate distributor switch 11 to actuate the particular number solenoid 18. Thus neither the typing of a decimal point nor the columnizing of figures requires the loss of any of the twenty numbers appearing at the calculator registers.

The function switches 22, 23 have a fourth position—the "Omit" position 29. In this position the register corresponding to that function switch is simply passed over and not printed. The typewriter is not spaced; the number is simply omitted from the series typed by the typewriter.

Whenever any position of the stepping switch 32 involves the omission or complete absence of a typing operation, special means must be provided to cause the switch 32 to step over to the next position. This is because it is the actuation or stroking of a type key that normally causes the switch 32 to step. When no key is operated, some means must be provided to shunt the impulse switch 62 and energize the solenoid 38 to cause a stepping of the switch.

In the case of the "Omit" position, all of the omit terminals 29 of the function switches 22, 23 are connected to an omit circuit 68 and thence by a lead 96 to a "self-stepping" point 97, which has significance only schematically and does not necessarily represent a particular terminal. From the point 97 the circuit goes through a self-interrupting switch 98, which will be presently described, and thence to the solenoid 38, ballast resistor 64, and negative terminal 58. It will be noted that the switches 61 and 62 are thus shunted by the hereinbefore described first circuit, this shunting consisting of the elements 41, 37, 36, 34, 31, 24, 44, 29, 68, 96, 131, 97, and 98.

The self-interrupting switch 98 is a conventional part of the stepping switch 32 itself, and its details form no part of the instant invention, although its function will now be described in order to understand the present invention. The switch 98 is physically linked to the plunger of the solenoid 38 in such a manner that it is normally closed, but is opened whenever the solenoid 38 is energized, and is then re-closed when the solenoid 38 is de-energized. As will become apparent hereinafter, this provides a vehicle for the self-stepping of the switch 32, so that it can be made to trigger itself successively from step to step, i. e., from contact 33 to contact 34, etc., provided proper connections are made. Thus when a circuit shunting the normal impulsing switch 62 is completed through the switch 98, the arm 36 simply steps on to the next contact and continues to step as long as a connection exists from the lead 59 to the point 97, shunting the switches 61 and 62. This self-stepping switch 98 is also used on the last eight contacts 100 of the stepping switch 32, which are not used in the practice of the present invention, and which must therefore simply be stepped over in order to bring the switch back to its home position 43.

For certain purposes it is desirable that some of the typed rows of numbers be indicated as negative. Means are therefore provided for causing the typewriter to automatically type a minus sign after such a row has been typed. To this end a minus key actuator or solenoid 99 is mounted to the typewriter and linked to the minus lever so as to cause the minus symbol to be typed. The minus is inserted after all the numbers have been typed, i. e., after the arm 36 has been stepped around to the contact 101. The circuit for typing of the minus goes from the positive terminal 39 through the elements 42, 59, 41, 37, 36, and 101. Thence the circuit goes through a conductor 102 over to a switch 103 mounted preferably to the calculating machine. The switch 103 is a double throw, manually actuated, snap switch, which, in its lower position 104 returns the circuit through a conductor 105 to the minus solenoid 99 and thence through the elements 49, 51, 53, 52, 56, and 57 to the negative terminal 58. Typing of the minus symbol actuates the switch 62 to step the switch arm 36 onto the next stepping switch contact 106, in a manner similar to that explained hereinbefore.

If a minus sign is not desired, the switch 103 is moved to its upper position 107, in which case the circuit, instead of returning through the minus solenoid 99, returns to the point 97 through the "Omit" lead 96, and thence through the self-stepping switch 98 and solenoid 38 to the negative terminal 58; in this case the switch 32 is simply stepped one step without typing any symbol.

When all of the registers have been sampled by the stepping switch 32, the tabulator key is actuated by the arm 36 coming into contact with the contact 106. This energizes the tabulator solenoid 93 through a lead 108 and the hereinbefore described elements 83, 88, 89, and 91. The typewriter carriage then tabulates over to the right hand margin stop of the typewriter. In accordance with the instant invention there is mounted to the typewriter a microswitch 109, which is actuated to closed position by the stopping of the carriage against the margin stop. Closing of the switch 109 energizes a carriage return actuator or solenoid 111, which operates the carriage return key or lever of the typewriter and causes the typewriter carriage to automatically return. As the return run starts, the switch 109 is opened. The circuit for the carriage return solenoid 111 may be traced from the positive terminal 39 through the elements 42, 59, 109, 111, 49, 51, 53, 52, 56, and 57, back to the negative terminal 58.

It is possible that an inexperienced operator might program the apparatus so that the right-hand margin stop of the typewriter is encountered before all of the numbers have been typed, and before the arm 36 has gotten around to the contact 106. In this event the stepping switch would continue to energize, successively, the number solenoids 18 and the typewriter keys would be operated during the return of the typewriter carriage. This would probably jam the typewriter and might seriously damage it. To preclude this possibility the microswitch 57 is introduced into the first circuit mentioned hereinbefore, and is mounted to the typewriter in such a manner that it is opened during the return run of the carriage, and is closed at all other times. This completely precludes solenoid operation of any of the typewriter keys during the return run of the carriage, even though the apparatus might be misprogrammed.

After a particular calculation has been completed and the registers of the calculating machine have come to rest in their final position, means must be provided for starting the stepping switch 32 on its sampling cycle; that is, means must be provided for getting the arm 36 off the "Home" position 43. This means takes the form of any one of a number of switches preferably mounted to the calculating machine and shunting the switches 42, 61, and 62. For this purpose a lead 112 is taken directly from the positive terminal 39 over to a switch group 113, this circuit being returned to the stepping switch solenoid 38 by a lead 114, which joins with the lead 63 at the upper terminal of the impulse switch 62. The switch group 113 comprises four switches 116, 117, 118, and 119 all manually actuated. If it is desired that the typewriter not type out the registers until called for by the operator, then toggle switch 117 is kept open in a position marked "Manual." This enables the operator to control initiation of the typing out operation through the push button 116, which is biased open. Momentary closing of the switch 116 energizes the solenoid 38 to cock the stepping switch 32; and when the operator's finger is removed from the switch 116, the opening of the circuit and consequent de-energization of the solenoid 38 causes the switch arm 36 to step off the "Home" position 43 counterclockwise to the first contact 33. From there on operation is effected automatically until the switch arm 36 has completed a full cycle and returned to the "Home" 43.

If it is desired that the typewriter type out the registered numbers as soon as the calculator has completed its calculation, the switch 117 is closed—this position being marked "Auto." In series with the switch 117 are the switches 118 and 119, which are in parallel with each other. The switch 118 is normally open and is closed whenever the multiplying button is depressed on the calculating machine, or calculator. As will be readily understood by those familiar with calculating machines, the muliplying button, when depressed, sets into operation a multiplying operation of the calculator, and the button stays depressed during the operation. When the operation is completed, the button automatically snaps up. Since the switch 118 is linked directly to a multiplying linkage of the calculator, it is closed when the multiplying operation is started, and this cocks the stepping switch 32. The arm 36, however, does not move until de-energization of the solenoid 38, which occurs upon the completion of the multiplying operation and opening of the switch 118.

The switch 119 is operated in a manner similar to that described for the switch 118, except that it is linked to the plus-minus button of the calculator.

Before proceeding with a detailed explanation of the operation of this circuit, it will be noted in passing that the relays 72 and 86 are each provided with holding-in contacts 121 and 122, respectively, which are connected in shunt around the particular switches which first cause the relays to pick up. That is to say, the contacts 121 are shunted around the switch 52—54, and the contacts 122 are shunted around the switch 87. Thus when these actuating switches 52 or 87 are opened, the relay remains picked up until the circuit is opened elsewhere.

Additionally, a particular characteristic of the stepping switch 32 will be described in order to complete understanding of the function of this circuit. While the switch 32 has been shown here schematically as consisting of thirty-two contacts and the home contact 43 spaced around the circumference of a circle and engaged successively by a single contact arm 36, each bank of the switch 32 is actually composed of three arcs of contacts, each covering approximately 120° of arc, and the arm 36 is in fact, physically, three arms which successively engage each of the three arcs of switches. This particular structure renders necessary a stepping point so that the switch may step from one arc of contacts to the next. The two stepping points in this switch are located at the contacts 123 and 124. When the arm or arms 36 engage these contacts, the switch is simply automatically stepped on to the next contact, in a manner which will be readily apparent hereinafter.

By way of further explanation, it will be noted that the typewriter to which the instant invention is applicable is of the sort where a momentary depression of any particular key serves to initiate that particular operation, even though the key is not held depressed. That is to say, when one of the solenoids 18 is energized, if the energization persists long enough to cause a typing stroke to start, then the solenoid 18 may be de-energized and the typewriter will automatically carry through the stroking operation, striking the platen and retracting to its rest position. It is not necessary to retain energization of the solenoid 18 once the key has started on its way. This applies to the period solenoid 79 and the minus solenoid 99, as well as to the numeral solenoids 18.

In similar vein, once a tabulator run has been started by the carriage, it is not necessary to retain energization in the tabulator solenoid 93, and once the carriage has started to return, it is not necessary to retain energization in the solenoid 111.

*Operation*

An exemplary typing-out cycle of operation will now be described with particular reference to Figs. 2a, 2b, and 2c. In the chart constituted by these figures, the horizontal reference is time, and the several chart lines represent the operation of the various elements in the circuit shown in Figs. 1a and 1b. The flow of control or stimulus from one element to the other is represented by arrowed vertical lines, which will be called stimulus lines since they indicate how the operation of one element initiates operation of another element. The reference numerals at the beginning, or left-hand end, of each chart line correspond to the numerals used for the particular elements shown in Figs. 1a and 1b.

At the start of a cycle, all elements are in their de-energized or normal position, and the switch 32 is in the "Home" position 43. When the twenty registers of the calculator have been positioned as desired, a typing-out cycle is initiated. This is done by the closing and opening of one of the switches 116, 118, or 119. Let it be assumed that manual operation is desired, and at the time point 501 (Fig. 2a) the switch 116 is closed, energizing the solenoid 38 and cocking the switch 32. Nothing happens until the switch 116 is opened by the operator's removing his finger from the switch button. When this occurs at point 502, the solenoid 38 de-energizes and at the point 503 the arm 36 of the switch 32 starts to step from the home contact 43 to the contact 33 as shown by the stimulus line 504. As soon as the arm 36 leaves the home position the switch 42 is closed as shown by the stimulus line 506. This places the positive terminal 39 in connection with the point 59 and readies the above described first and second circuits for the stepping cycle of the switch 32.

When the arm 36 engages the contact 33 as shown at 507, positive potential is applied to the corresponding lead 31, which applies energy through the first of the function switches, in this case, the function switch 23. If it be assumed that this switch is positioned in the print position as shown at 26', then positive potential is applied directly to the corresponding distributor switch 12. Thence the potential goes to whichever numeral solenoid 18 the arm 16' of the distributor directs it, as determined by the setting of the calculator register to which the arm 16' is linked. Thus energy is applied to one of the number solenoids 18 as shown by the stimulus line 508. There is an appreciable time lag between the application of energy to a solenoid 18 and the initiation of a typing stroke. This is due to the physical nature of the link between the solenoid plunger and the typing lever, and particularly to the resilient quality thereof, as will be explained hereinafter. Thus it is not until the time 509 that the number key corresponding to the particular energized number solenoid 18 is started on its stroke as shown by the stimulus line 511. The chart line representing the typewriter key stroke has been denominated 201, and will be used hereinafter to indicate any one of the ten number keys of the typewriter.

As the key 201 goes forward in its typing stroke, it actuates first the switch 52 from its position 53 to its position 54. This occurs at the time 512. Departure of the switch 52 from the contact 53 opens the circuit through which current flows to the particular solenoid 18, and that solenoid is de-energized as shown at 513. The typing key 201 then continues its stroke until the point 514 is reached, when the micro switch 62 is closed. Closing of the switch 62 applies energy to the solenoid 38 as shown at 516, and cocks the stepping switch 32.

Next in the cycle the key 201 strikes the platen as shown at 517, and its numeral is printed. As the key starts back, or retracts, it first actuates the typewriter carriage to move it one space as shown by the stimulus line 518. This operation is implicit in the typewriter and forms no part of the instant invention, except that it is of course utilized for the typing function. The chart line 202 indicates the movement of the carriage, and this numeral will be hereinafter used for referring to the carriage in general. Shortly after the carriage has been started on its single space movement denoted by the line 519, the key 201 in its retracting movement, or stroke, causes the switch 62 to open as shown by the stimulus line 521. As soon as the switch 62 has broken contact as shown at 522, current starts to die out in the solenoid 38 and shortly thereafter as shown at 523 the arm 36 of the stepping switch 32 begins to step over to the next contact 34.

For explanatory purposes, it will be herein assumed that the function switch 22 corresponding to the next register element, i. e., the register element to which the contact 34 corresponds, has been moved to the period position 27. A short time after the arm 36 has come to rest in engagement with the contact 34, as shown at 524, the key 201 in its retracting stroke passes the point 526 where the key switch 52 snaps from its contact 54 to the contact 53. When the contact 53 is engaged, as shown at 527, a circuit is completed to the next key solenoid. In this case, because the corresponding function switch 22 has been placed in the position 27, the circuit is completed through the connection 66 and 69, placing positive potential on the period solenoid 79 through the rectifier 73, switch arm 74, contact 76, and lead 78. While potential is also applied to the top terminal of the relay coil 71, this circuit is broken at the contact 54 so the relay 72 is not energized. An appreciable length of time after energy has been applied to the solenoid 79, the period key starts forward in its typing stroke, as shown by the stimulus line 528. Numeral 203 has been used to designate the period key generally, and to designate the chart representing this key.

Like the number key 201, the period key 203, at point 529 in its stroke, snaps key switch 52 to the contact 54. Breaking of the contact at 53 de-energizes the solenoid 79 as shown at 531; and when contact is made at 54, the relay coil 71 is energized as shown by the line 532. At time 533 the special period switch 61 is opened, so that when the impulse switch 62 is closed at 534, there is still no circuit completed to the stepping solenoid 38. Thus the switch 32 does not step with a stroke of the period key 203. As the period key falls back, a space movement of the carriage 202 is effected at 535, and shortly thereafter the switch 62 is opened, as with the number key 201 previously described. When the point 536 is reached in the retracting stroke of the period key 203, the switch 61 is re-closed, but by that time the switch 62 has opened so that the solenoid 38 never receives potential.

At time 537 the period key 203 causes the switch 52 to move from contact 54 to contact 53. As soon as contact is made at 53, a circuit is completed through whichever number solenoid 18 the particular distributor switch 11 corresponding to the contact 34 was set. Since the period relay 72 has now been picked up, its contacts 121 serve to hold the relay closed in spite of the opening of the contact at 54. Thus when contact is made at 53 as shown at 538, a circuit is completed from the positive terminal 39 through the elements 42, 59, 41, 37, 36, 34, 31, 24, 44, 27, 66, 69, 73, 74, 77, 81, 37', 36', 34', 31', 14, 16, 17, 47, and to the particular number solenoid 18 to which the distributor switch 11 has been positioned by the calculator register element. The circuit is completed, as before, from the point 19 through the elements 48, 49, 51, 53, 52, 56, and 57, back to the negative terminal 58.

It will now be understood why the second bank of contacts 32' is needed. Since there is only one period relay 72, by the time the circuit has been completed through this relay, it is necessary to re-define which of the twenty distributor switches 11 is to be sampled at that particular time. This is done by the second bank 32' whose arm 36' duplicates exactly the movement of the first arm 36. As an alternative, it would be possible to achieve the same result by providing twenty different period relays 72, or providing a single relay having twenty different switches 74—77. This arrangement would be quite cumbersome, and it has been found in practice preferable to use a double banked stepping switch 32—32'.

Some time after energization of the selected number solenoid 18, the corresponding typewriter key 201 is impelled forward on its stroke as shown at 539. This stroke of the key 201 is substantially the same as the previous stroke of the key 201, and actuates the same other elements. It will be noted that the relay 72, held in by its holding contacts 121, is de-energized by the breaking of contact between the arm 36 and the point 34, as shown by the stimulus line 541. Thus as the stepping switch 32 steps to the next position 129, the period relay 72 is returned to quiescent state.

It will be assumed for illustrative purposes that the next succeeding contact 129 is connected to a function switch 22, 23 which is disposed in the tabulator position 28. Thus when the typewriter has typed the next number after the period, as described hereinbefore, the carriage 202 will be tabulated over a predetermined number of spaces and then the number selected by the distributor switch 11 corresponding to the contact 129 will be typed. This is effected in the following way. By the time 542 the circuit has completed the typing stroke effected through the second bank 32', and the number key 201 is dropping back to its rest position. At the time 542 in the stroke of the key 201, the switch 52 is moved from its contact 54 to its contact 53. When contact is made at 53 as shown at 543, a circuit is completed to the tabulator solenoid 93 through the corresponding function switch 22, 23 which, it has been assumed, is in the tabulator position 28. This circuit is from the positive terminal 39 through the elements 42, 59, 41, 37, 36, 129, 31, 24, 44, 28, 67, 83, 88, 89, 91, 93, 94, 49, 51, 53, 52, 56, 57, and back to the negative terminal 58. Thus current starts to flow through the solenoid 93 as shown at 544. By the time 546 (Fig. 2b), the solenoid 93 has initiated a tabulating run of the carriage 202 as shown at 547. The relay 86 can not pick up because the switch 87 is open. The start of this tabulating run involves the movement of certain levers and links on the typewriter, to be described in more detail hereinafter. One of these links causes the switch 49 to open as shown at 548. Shortly thereafter the carriage starts on its tabulating run as shown at 545. Opening of the switch 49 de-energizes the solenoid 93 as shown at 549.

As the tabulating run is ending, a lever to be described hereinafter is pushed and retracted. This effects a momentary closing of the switch 87 as shown at 551. Such closing energizes the relay coil 84 as shown at 553. The relay 86 holds itself energized by virtue of the holding contacts 122, which close at the same time 558 that the switch 89 moves from position 91 to 92. In spite of the very rapid reopening of the switch 87, the relay 84 picks up first, and is held in by its contacts 122 before the switch 87 opens at 552. At time 554, just before the tabulating run of the carriage is stopped, the switch 49 is closed as shown at 554. In the meantime, switch 89 has engaged contact 92 as shown at 559 to complete a circuit to one of the number solenoids 18 through the second bank 32' of the stepping switch. This circuit is from the positive terminal 39 through the elements 42, 59, 41, 37, 36, 129, 31, 24, 44, 28, 67, 83, 88, 89, 92, 81, 37', 36', 129', 31', and to the distributor switch 11 corresponding to the contacts 129 and 129'. This distributor switch applies the potential to a pre-selected number solenoid 18 as described hereinbefore, and the circuit is completed through the elements 19, 48, 49, 51, 53, 52, 56, 57, and 58. The typing of a number then proceeds in substantially the same manner as described before in connection with the typing of a number following the typing of a period. There is one difference, however, and this is that the tabulator relay coil 84, unlike the period relay coil 71, is not de-energized by movement of the stepping switch 32. Instead the circuit is broken by the departure of the switch 52 from the contact 53 as shown at 561.

Sampling of the calculator register elements proceeds in the manner hereinbefore described for each of the contacts from 33 around to 123. For each register element the typewriter either types the number, types a period and then the number, or makes a tabulating space and then types the number, depending on whether the particular function switch corresponding to the register is in the position 26, 27, or 28. A number may be omitted, if desired, by positioning the function switch to terminal 29, as will be explained hereinafter.

Let it be assumed now that the arm 36 is on the contact just preceding the contact 123. At time 562 the arm 36 comes into engagement with the contact 123. Normally, the engagement of the arm 36 with any given contact would not be cause for the initiating of any particular action; since, in general, action circuits are open at this time and are closed only by the subsequent closing of other contacts. On the contact 123, however, a circuit is immediately completed to the stepping solenoid 38. This circuit is from the terminal 39 through the elements 42, 59, 41, 37, 36, 123, 131, 97, 98, 38, 64, to 58. This immediately energizes the solenoid 38 to cock the switch, as shown by the stimulus line 563. At time 564 the solenoid has effected cocking of the stepping switch, and this causes the ancillary self-interrupting switch 98 to open as shown at 566. Opening of the switch 98 breaks the circuit, traced immediately above, as shown at 567, and de-energizes the stepping solenoid 38. At the time 568 the de-energization of the solenoid 38 brings about another stepping of the arm 36, which then moves as shown at 569 to the next contact 132.

Thus the contact 123 is immediately stepped past, without any other effect on the operation of the circuit. As explained hereinbefore, this is needed in order to step the switch 32 from one arc of contacts to another arc.

While the switch 98 opens and re-closes with each cocking and stepping of the stepping switch 32, it affects the circuit only on those particular occasions when a self-stepping action is desired, as described immediately hereinbefore. On other occasions no circuit is closed from the positive terminal 39 to the point 97, so that the closing of the self-stepping switch 98 has no effect on the stepping solenoid 38.

Stepping of the switch with consequent number typing as determined by the respective function switches proceeds until the contact 124 is encountered. The contact 124 is like the contact 132, in that it is needed to step the switch from one arc of contacts to the other. The action is therefore substantially the same as described hereinbefore in connection with the contact 123.

From the contact 124 the arm 36 moves to the contact 101 where the minus key of the typewriter is actuated, provided the switch 103 is in its position 104. This operation is substantially the same as the typing of any number key described hereinbefore, and has not been illustrated in the Figures 2a, 2b, and 2c. If a minus symbol is not desired, the switch 103 is placed in its position 107; the circuit from the arm 36 is then completed through the lead 96 to the self-stepping point 97, and the contact 101 is simply stepped by or omitted.

By this time all the registers have been sampled, and the typewriter carriage is ready to be returned. This is effected by engagement of the arm 36 with the contact 106. Referring again to Fig. 2b, let it be assumed that immediately before this engagement a minus symbol had been typed. Then when the arm 36 engages the contact 106 as shown at 571, the minus type key is still dropping back in its retracting stroke as shown at 572. At the time 573 the switch 52 is moved from its contact 54 to its contact 53, thereby completing a circuit to the tabulating solenoid 93, as shown at 575. If the minus insert switch 103 was in the position 107, so that the switch arm 36 merely stepped successively past the contacts 124 and 101, then the circuit to the solenoid 93 would be completed at the moment 571 when the arm 36 engaged the contact 106, somewhat in the manner of the engagement of the contact 132 illustrated at the point 574.

Whichever closing completes the circuit to the solenoid 93, the circuit is made as follows: From the terminal 39 through the elements 42, 59, 41, 37, 36, 106, 108, 83, 88, 89, 91, 93, 94, 49, 51, 53, 52, 56, 57, and 58.

At time 576 the solenoid 93 has set into motion a tabulating run of the carriage. As explained hereinbefore, this operates certain levers and links, one of which opens the micro switch 49 as shown by the stimulus line 577, and a moment thereafter, at 578, the carriage actually starts to move on its final tabulating run, over to the right-hand margin stop. Opening of the switch 49 de-energizes the tabulating solenoid 93 as shown at 579.

Near the completion of its final tabulating run and just before it is stopped by the right-hand margin stop, the carriage 202 actuates the carriage return switch 109, through levers to be described hereinafter, as shown by the stimulus line 581 (Fig. 2c). As shown at 582, closing of the switch 109 energizes the solenoid 111, which is connected to depress the carriage return button on the typewriter. By the time 583 the solenoid 111 has taken effect and initiates a return run of the carriage as shown at 584.

In the meantime, termination of the final tabulating run of the carriage has effected closing of the tabulator relay pickup switch 87 as shown at 586. Energization of the relay coil 84, initiated at 589 through the switch 87, causes the double throw switch 89, which is part of the relay 86, to leave the contact 91 as shown at 591. This prevents re-energization of the solenoid 93 with its consequent reinstituting of another tabulating run when the micro switch 49 closes at 587. Contact of switch 89 at 92 also institutes the final series of steps of switch 32, as shown at 590, and as will be explained hereinafter. The carriage then comes to rest against the right-hand margin as shown at 588.

Unlike the termination of an ordinary tabulating run, the final tabulating run of the carriage causes the push lever which actuates the switch 87 to remain in advanced position, so that the switch 87 does not immediately open after closing, but remains closed as shown at 592. This has no effect on the operation of the apparatus, and is merely mentioned at this time so that a fully accurate understanding of the operation will be obtained.

Institution of the carriage return run at 584 as described hereinbefore first brings about the operation of certain levers and linkages, one of which effects opening of the carriage return safety switch 57 as shown at 593. Very shortly thereafter the carriage is started on its return run as shown at 594. Upon institution of the return run the switch 87 is first opened as shown at 596, and then the switch 109 is opened as shown at 597. In the meantime, however, the solenoid 111 has been de-energized by the opening of the switch 57 as shown at 598, since the switch 57 controls all of the typewriter solenoids.

Since operation of the tabulator relay 86 has switched control to the second bank 32' of the stepping switch, it is necessary to provide a lead 133 to connect the contact 106' down to the self-stepping point 97. Without the lead 133 the circuit would not be completed to continue the stepping of the switch. This circuit is completed from the terminal 39 through the elements 42, 59, 41, 37, 36, 106, 108, 83, 88, 89, 92, 81, 37', 36', 106', 133, 97, 98, 38, 64, and 58. Thus the solenoid 38 is energized as shown at 601 and self-stepping of the switch then proceeds automatically from the contact 134 back to the home contact 43, where the circuit is broken. A portion of this self-stepping operation is shown at 602. Since there is no type key being operated to open the switch 52, the relay coil 84 is de-energized by the departure of the arm 36 from the contact 106 as shown at 603. As the arm 36 comes to rest on the home contact 43, the switch 42 is opened as shown at 604, disabling the first circuit entirely and bringing the entire apparatus to rest until the switch 62 is again shunted by closing of one of the switches in the group 113.

The purpose of the carriage return safety switch 57 is to protect the typewriter in the event an operator should incorrectly program the apparatus. The switch 57 is opened at 593, as described hereinbefore, and remains open until the carriage return run is completed, as shown at 606. Opening of the switch 57 completely disables the first, or key solenoid, circuit, so that no typewriter key solenoids may be energized during this return run. This protects the typewriter in the event an operator should incorrectly program the apparatus, as by moving up the right-hand margin stop to a point where it is engaged before all the registered numbers have been typed. At the same time it will be noted that the switch 57 does not affect the second, or stepping switch, circuit, so that the switch may continue its self-stepping back to the home position 43.

It is to be understood that the timing charts of Figs. 2a, 2b and 2c are for explanatory purposes only, and in many cases do not represent the proper time proportions in the operation of the several elements. For example, the micro switches actually snap open and closed much more rapidly than indicated, but the charts have been proportioned so that the stimulus lines could be separated sufficiently to show the relative order of operation of the several parts. Such distortion is particularly evident in the showing of the termination of the carriage run as it strikes the right-hand margin stop in the region exemplified by the numbers 581 through 596. Here the successive operations of the micro switch 87 and relay 86 occur much more rapidly than would appear from the diagram, but as noted above, their operation must be stretched out in the chart in order to separate and give meaning to the various stimulus lines shown.

It will be noted that the circuit is arranged so as to minimize the number of occasions when a circuit is broken by departure of the arm 36 from one of the contacts of the stepping switch 32; and when such breaking does occur, the only current involved is the relatively small current flowing through one of the relay coils 71 or 84 rather than the appreciably greater current in one of the key-operating solenoids. Thus the stepping switch contacts are protected from arcing wear, such arcing being taken up by the more rugged and cheaper micro switches, as for example, the switch 52 or switch 49.

An exemplary operation when a function switch is moved to the "Omit" position 29 has not been described in conjunction with Figs. 2a, 2b, and 2c, but it is believed that such operation will be obvious, since it closely parallels the self-stepping of the switch past the contacts 123, 124, or 134. Assume for example, that one of the function switches 22 is moved to the "Omit" position 29. When the arm 36 reaches the contact corresponding to that particular function switch, a circuit is made from the arm 36 through the contact, through the lead 31 to the "Omit contact 29. The circuit then proceeds through the leads 68 and 96 back to the self-stepping switch 98. This causes the switch to immediately step past that particular contact without ever sampling the distributor switch 11 associated with that particular contact. Thus that register element is completely omitted from the typed line; the typewriter does not type a space in its place; it simply passes over that number and goes on to the next register element.

The rectifier 73 is for the purpose of blocking improper operation of the period relay 72, which operation would, under certain circumstances, isolate the period solenoid 79 and preclude the typing of decimal points.

Assume that the rectifier 73 were not in the circuit, and that a number key 201 has just started forward on a typing stroke, as shown at time 511 in Fig. 2a. At time 512 the micro switch 52 is moved by the key stroke from its contact 53 to its contact 54. Departure from contact 53 breaks the normal circuit through the number key solenoid 18, as shown at 513; but at time 521 when the contact 54 is engaged, a back circuit is completed, which at times has been found effective to cause the period relay 72 to pick up. This back circuit is as follows: From the positive terminal 39, through the elements 42, 59, 41, 37, 36, 33, 31, one of the function switches 22, one of the distributor switches 11, one of the number solenoids 18, to the point 48. The normal circuit from here on has been broken at 53 (time 512 in Fig. 2a). The back circuit is now made, however, through the period solenoid 79, the contact 76, arm 74 and (since the rectifier 73 is assumed to be out of the circuit) to the relay coil 71. The circuit then continues through the elements 54, 52, 56, 57, and 58.

The resistance of the relay coil 71 is several times that of the solenoids 79 and 18. Therefore, in spite of the fact that the voltage must span the three elements 18, 79, and 71 in series, the greater portion of the voltage drop appears across the relay coil 71; and in many cases this has been found sufficient to energize the relay coil 71 sufficiently to cause the relay 72 to pick up. The relay 72 is thus held continuously energized, disabling the period solenoid 79 and precluding the printing of decimal points.

Another back circuit also results from the fact that the stepping switch 32 steps over so rapidly from one contact to the other that in many cases the period relay 72 does not have time to drop out, and remains held in by a circuit which will be traced hereinafter. Assume, by way of example, that the function switch 22 corresponding to the contact 34 is in the period position 27, and that the next function switch, corresponding to the contact 129, is in the print position. The circuit will operate in the normal fashion, first typing the period 203 and then typing the numeral corresponding to the contact 34, as shown as 539 in Fig. 2a. However, at time 541, when the relay coil 71 is normally de-energized, it has been found in practice that the stepping switch 32 steps so rapidly that contact is made at 129 before the period relay 72 has had time to drop out. The coil 71 is thus held energized by a circuit which will be traced as follows: From the positive terminal 39 through the elements 42, 59, 41, 37, 36, 129, 31, the function switch 22, print contact 26, lead 46, lead 31′, contact 129′, arm 36′, terminal 37′, contact 77, arm 74, to the coil 71. It being remembered that the relay 72 is still picked up, the circuit continues through the holding-in contacts 121, lead 56, switch 57, to the negative terminal 58. Thus the period relay will be held energized, and when next a function switch 22 is encountered which is set to type a period, it will not do so because of the isolating of the period solenoid 79.

Both of the extraneous or back circuits described above are blocked by the interposition of the rectifier 73 in the circuit.

Because of the fast stepping time of the stepping switch 32, the circuit can not accommodate two adjacent function switches each set to the period position 27. This is because the first of the two switches brings about picking up of the period relay 72, and when the next contact of the stepping switch 32 is made, a circuit is immediately completed through the period terminal 27 of the next function switch directly to the relay coil 71, and causes it to be continuously energized. Thus the second of two adjacent function switches each set for a period will not type the period. As long as a function switch set for a period is followed by another function switch which is set for anything except a period, however, proper operation will be effected.

As a matter of practice, this shortcoming is of little weight, since in no normal circumstance of arithmetical tabulation would it be desired to have decimal points following adjacent numerals.

The same shortcoming does not apply to the tabulator circuit, where it is possible to tabulate after each of the twenty numerals, if desired, and still achieve proper operation.

*Switch mounting on calculating machine*

The physical arrangement and mounting of the various switches on the calculating machine, shown schematically in Fig. 1b, will now be described.

Fig. 3 is a perspective view of a typical calculating machine to which the instant invention is applicable. A machine of this general character is disclosed in U. S. Patent 2,399,917, to which reference is hereby made for a further understanding of the present invention. To the sloped operating panel 205 of the machine are mounted the three manually operable switches 116, 117, and 103. As stated hereinbefore, the switch 116 is of the push button type and is biased to open position. Momentary depression of the button 116 serves to institute a type-out operation. Switch 117 is a toggle type switch which remains in the position in which it is manually operated. As described hereinbefore, this switch determines whether the type-out operation will be effected automatically as soon as the machine has completed a calculation, or whether the apparatus will wait for a depression of the push button 116. Switch 103 is likewise a toggle switch which remains in the position to which it is thrown. As stated before, this switch determines whether a minus sign will or will not be inserted at the end of any line of figures.

The switches 118 and 119 shown schematically in Fig. 1b are mounted to be operated automatically by certain levers of the machine, and will be described hereinafter.

The windows 204 on the machine carriage are adjacent to the twenty register elements of the machine. At these windows appear selectively the ten numbers indicated on the twenty register elements 206 (Fig. 5). The register elements 206 are supported and rotated by twenty shafts 207, the ends 208 of which are knurled and normally project through openings in the top casing of the calculating machine carriage.

In accordance with the instant invention the normal top plate of the carriage is removed and replaced by an enlarged housing 209 within which are contained the twenty distributor switches 11 and the twenty function switches 22. Further in accordance with the instant invention each shaft 207 is surmounted by an insulating cylinder 211 pressed over the shaft end 208. Around the upper end of the cylinder 211 is a conducting annulus 212 and formed integral therewith is a diametral conducting finger 16, which is resilient so as to be biased outwardly against one of the ten contacts 17 forming part of the switch 11. The contacts 17 are disposed around a circle in a plane normal to the shaft end 208 and concentric therewith. They are secured to a ledge 214 formed integral with a mounting wall 216 secured by screws 217 to the machine carriage. As explained hereinbefore in connection with Fig. 1b, all of the terminals 17 corresponding to a given digit are connected together by conductors 13 (Fig. 4) there being ten such conductors 13, one for each of the ten digits. These conductors lead to the respective conductors 47 (Fig. 1b) which form part of the multi-conductor cable connecting the calculating machine and the typewriter.

To the other side of the wall 216 opposite the ledge 214 are mounted twenty insulating brackets 218, each carrying one of the function switches 22. Embedded in and passing through the bracket 218 are the four stationary contacts 26, 27, 28, and 29, which are selectively engaged by the conducting arm 44 actuated by an upwardly extending arm 219 surmounted by a finger knob or button 221. The side edge of the arm 219 is provided with a series of depressions 222 into which a detent roller 223 is pressed by its spring mounting arm 224. In this way the arm 219 and the conducting arm 44 are retained selectively in positions contacting one of the stationary contacts 26—29. The arm 44 makes contact with the screw shaft 226 on which it and the arm 219 are mounted, and on the other side of the bracket 218 is secured a conducting clip bent over at the top to constitute the terminal 24. Each of the terminals 24 is connected by a lead 31 (Fig. 1b) to the typewriter. There are thus twenty such leads 31 also forming part of the multi-conductor cable connecting the calculating machine and the typewriter.

Each function switch and distributor switch combination 22, 11 has a conducting brush constituting the common terminal 14 of the respective distributor switch. This brush 14 slides against the annulus 212 and thus makes constant contact with the distributing arm 16. The brush 14 is connected by means of a terminal screw 227 and lead 46 to the contact 26 of the respective function switch 22.

Each of the contacts 27—29 is connected to its counterpart on the adjacent function switch by means of leads 66, 67, and 68 shown schematically in Fig. 1b. These leads in turn become the three leads 69, 83, and 96 forming an additional part of the multi-conductor cable connecting the calculating machine and the typewriter. For clarity of description the physical views shown in Figs.

3-6 have not been burdened with these various conductors. As shown in Figs. 3 and 5 the arms 219 extend to the exterior of the carriage housing 209 through slots 229.

The mounting for the multiply switch 118 (Fig. 1b) is shown in Fig. 7. This is a view taken looking at the left side of the calculating machine shown in Fig. 3, and the details shown in Fig. 7 are approximately the same as those described in said Patent 2,399,917. The calculating machine includes a vertical plate 231 which is stationarily mounted with respect to the machine frame. To the outer face of the plate 231 is secured the micro switch 118 having a switch button 232 actuated by an arm 233, the free end of which carries a roller 234. The roller bears against an arm 236 pivoted at 237. The position shown in Fig. 7 is the quiescent position of the apparatus, and in this position the switch 118 is open as shown in Fig. 1b.

The operation of the machine is such that after the operator has inserted a predetermined problem into the keyboard, he depresses one of the multiplying finger buttons 238 to institute a multiplying operation. Such institution of the multiplying operation causes the arm 236 to pivot slightly counterclockwise about the pivot point 237. This causes the arm 233 to press against the button 232 and close the switch 118. This position is retained during the multiplying operation of the machine. When the operation is completed and the register elements 206 have all been positioned to indicate the answer, the lever 236 returns to quiescent position by pivoting clockwise. This releases the switch button 232 and causes the switch 118 to open. It will be recalled that it is this closing and opening of the switch 118 that causes the stepping switch 32 to make its first step off the home contact 43 onto the first contact 33. Thus a typing-out cycle is automatically instituted the moment the register elements 206 have come to rest in their proper positions.

It is desirable, as mentioned hereinbefore, that such a typing-out operation also be automatically instituted when other operations, as for example, a plus or minus operation is completed. This is achieved through the closing and opening of the switch 119 illustrated in Figs. 8, 9, 10, and 11.

Referring to Fig. 8, a fragmentary portion at the right-hand side of the calculating machine panel 205 is illustrated, showing the minus finger button 239 and the plus finger button 241. Disposed beneath and at the side of the buttons 239 and 241 is a bracket 242 having inner vertical tabs 243 by means of which the bracket 242 is secured to the frame of the machine as shown at 244. Opposite the tabs 243 the bracket 242 is provided with a downwardly extending flange 246 to which the switch 119 is secured by means of bolts 247. Wrapped around the switch 119 is another bracket 248 having aligned openings 249 to accommodate one of the mounting screws 247. Formed integral at the upper end of the bracket 248 is a resilient actuating arm 251 which extends above the button 252 of the switch 119 and then continues to a region just beneath the end edges of the adjacent buttons 239 and 241. It will be seen that this disposition of the arm 251 is such that when either the button 239 or the button 241 is depressed, it will engage the arm 251 to press it downward against the button 252.

The operation of this portion of the machine is similar to that described in connection with the multiply switch 118. After the problem has been inserted into the keyboard of the machine, either the plus button 241 or the minus button 239 is depressed, and the operation of the machine is such that this button stays depressed while the machine is effecting the calculation. As soon as the calculation is completed and the register elements 206 have come to rest with the proper answer, the depressed finger button snaps up thereby releasing the arm 251 and the butttton 252. In this way either a plus or minus operation of the machine causes closing and opening of the switch 119 to effect the first step of the stepping switch 32 and thus institute a typing-out cycle.

Switch mounting on typewriter

The manner in which certain of the elements shown in Fig. 1a are mounted to the typewriter will now be described in conjunction with Figs. 12 through 23. The typewriter to which the instant invention has been applied by way of example is generally of the type shown in U. S. Patents 1,955,614 and 2,506,444. While certain details of construction differ from those shown in these patents, it is believed that reference to these patents will aid somewhat in understanding the instant invention.

Fig. 12 is a fragmentary cross-section taken in a vertical plane with the front of the typewriter being represented by the numeral 256. In accordance with the instant invention a transverse mounting plate 257 is mounted laterally at the bottom of the typewriter, and to this plate are secured in upright fashion the various key operating solenoids 18, 79, 99, 93, and 111. These solenoids are disposed beneath the respective actuating levers 258 which they are designed to operate. Each solenoid has a plunger 259 threaded at its outer end to receive therearound the end of a linking spring 261. The turns of the springs 261 constitute threads engageable with the threads on the plungers 259. While the diameter of the springs 261 is normally uniform along the length, the threading of the springs onto the plungers 259 causes the threaded ends of the springs to expand somewhat as shown in Figs. 12 and 13. The upper end of each spring 261 is hooked as shown at 262 around the appropriate tab lever 258. Thus when any one of the solenoids is energized, it pulls the respective lever 258 down to simulate operation of that lever by the fingers of the typist.

The conventional operation of the typewriter will now be briefly described in order to lay a foundation for a better understanding of the operation of the instant invention. Referring still to Fig. 12, the typewriter is provided with a rubber coated driver roller 259 which is kept constantly rotating by an electric motor. A plurality of substantially identical levers are pivoted to the typewriter frame at 361, each lever serving to actuate a type key to strike the platen by linkages not shown here. In Fig. 12, the period key lever 203 has been shown, and it will be understood that lever 203 is exemplary of all key levers including the levers 201 of Figs. 2a and 2b. Each lever 203 has associated therewith an individual cam driving member 362. When cam member 362 is brought into engagement with the roller 359, which is constantly rotating counterclockwise, it is driven clockwise about pivot 361 and this in turn actuates the lever 203 into a clockwise typing stroke. This stroke, once initiated by engagement of the clutch 362 against the roller 359, is carried automatically through a cycle, with the lever 203 first pivoting clockwise until the type key linked thereto strikes the platen, and then drops back counterclockwise to its rest position shown in Fig. 12.

A stroke of a type lever 203 is instituted by depressing the corresponding finger lever 258, which brings the cam 362 into engagement with the roller 359. Once the cam comes into engagement with the roller, the typing stroke is continued automatically, irrespective of whether the lever 258 is held depressed or not. In fact, if the lever 258 is held depressed, only a single type stroke is effected, since the lever 258 must be returned to normal position and re-depressed for another type stroke.

Formed integral with each lever 203 is a depending finger 263 which bears against a flat plate 264 welded to a laterally mounted idler shaft 266. Any one of the type levers 203, upon effecting a type stroke, brings its depending finger 263 into engagement with the plate 264, causing the shaft 266 to oscillate slightly counterclockwise and then back. Secured to the shaft 266 is a crank arm 267, on the end of which is pivoted a push rod 268, carrying at its other end a linkage mechanism 269 leading to the ribbon raising mechanism of the typewriter. In this way each stroke of a typewriter key pivots the shaft 266 slightly counterclockwise and back, and pushes the rod 268 slightly to the left to raise the ribbon into type position.

The mechanism described above is conventional with the typewriter and forms no part of the instant invention, except that it constitutes a background into which the present invention is incorporated.

In accordance with the instant invention, the micro switches 52 and 62 are mounted to and beneath a plate 271 on opposite sides of the push rod 268, as shown in Fig. 14. The microswitch 52 has an operating arm 272 which serves to depress the switch button 273. The end of the arm 272 is engaged by the end of the push rod 268. Beyond the end of the rod 268 and spaced slightly from the arm 272, as shown at 274, is disposed the end of the operating arm 276 of the micro switch 62, which operates the switch button 277.

It will now be readily seen that whenever any one of the key operating solenoids is energized, one of the levers 203 is actuated to effect a typing stroke, and no matter which lever 203 is actuated, the push rod 268 is moved slightly to the rear (to the left in Figs. 12 and 14). This movement first actuates the micro switch 52 as shown at 512 in Fig. 2a, and then closes the micro switch 62 as shown at 514. The key then strikes the platen as shown at 517, and on the retracting stroke the switch 62 is reopened as shown at 521, and just before the quiescent or rest position of the lever 203 is reached, the switch 52 is re-actuated to its normal position 53, as shown at 526.

In order to actuate the period micro switch 61 a small hole 278 is drilled in the end of the depending finger 263 of the particular lever 203 corresponding to the period key. Into this hole is hooked one end of a link 279, the other end of which is hooked to the end of an actuating arm 281 associated with the period micro switch 61. The switch 61 is mounted to the typewriter frame by means of a plate 282, and the arm 281 is pivoted to the casing of the switch 61 by a pin 283. The arm 281 actuates the switch button 284 in the usual fashion. A pair of torsion springs 286 (Fig. 12) circumjacent the pin 283 on each side of the arm 281 serve to keep the arm biased away from the switch button 284. As explained hereinbefore, the switch 61 is normally closed. The mounting and linkage is so adjusted that the arm 281 actuates the button 284 to open the switch before the switch 62 is closed by the push rod 268. Thus as the period key lever 203 moves forward in its stroke operation, the micro switch 52 is first actuated as shown at 529 in Fig. 2a, then the microswitch 61 is opened by the link 279 as shown at 533, and finally the micro switch 62 is closed as shown at 534. As the key lever 203 drops back, these operations are reversed and in inverse order as shown in Fig. 2a.

The mounting and operation of the micro switches 49 and 87 will now be described with reference to Figs. 16, 17, 18, and 19.

The conventional or old elements of the typewriter and their operation will first be briefly described, and then the mounting and incorporation of the micro switches 49 and 87. Referring to Fig. 16, 287 represents in plan a portion of the typewriter frame at the left rear of the typewriter. Frame 287 carries, by means of a pin 288, a tabulating arm 289. The arm 289 is mounted on the pin 288 by means of a slot 291 in the arm 289, which not only permits the arm 289 to reciprocate longitudinally with respect to the pin 288, but also allows it to oscillate slightly about the pin in a horizontal plane, as best seen by reference to Figs. 16 and 18. On the right-hand end of the arm 289 is formed a rearwardly projecting finger 292 and a forwardly projecting horizontal tab 293. The left-hand end of the arm 289 is formed into a downwardly projecting, rearwardly offset tab 294. Pivoted at 296 is an actuating arm 297 (Fig. 17).

When the tabulator finger button is depressed on the typewriter keyboard, a cam clutch generally similar to the clutch 362 in Fig. 12 is engaged by the roller 359 to institute a tabulating cycle which proceeds independently of the further holding down of the tabulator key. Such institution of a tabulating cycle pivots the arm 297 counterclockwise in Fig. 17, causing it to push against the offset tab 294, thereby pivoting the arm 289 about the pin 288 counterclockwise in Fig. 16 to the position shown in Fig. 18. It is latched in this position automatically by means not shown, and simultaneously the typewriter carriage 202 is released. The carriage then moves swiftly and freely to the left until a pre-set tabulating stop engages the finger 292. The leftward movement of the carriage 202 pushes the lever 289 to the left in Fig. 16 to the Fig. 19 position; this unlatches lever 289 from its counterclockwise position, allowing it to snap clockwise back to the Fig. 16 position, and at the same time the carriage is stopped at its tabulated position. As the arm 289 is released to oscillate clockwise as above described, the tab finger 292 disengages itself from the tab stop, allowing the arm 289 to slide longitudinally to the right to its rest position shown in Fig. 16.

The above operation is conventional and forms no part of the present invention except that it constitutes a suitable mechanism for actuating the two microswitches now to be described. The microswitch 49 is secured to a plate 298, which is in turn bolted to the typewriter frame 287. The arm 299 of the microswitch 49 is pressed inwardly to depress the switch button 301 when the arm 289 is in the normal position shown in Fig. 16. In this position the microswitch 49 is closed as shown in Fig. 1a. It is inherently biased to the open position, however, so that when the arm 289 is pivoted counterclockwise to the position shown in Fig. 18, the switch 49 is opened.

Beyond the end of the arm 289 and to one side thereof, the microswitch 87 is also mounted to the plate 298. The arm 302 of the microswitch 87 is caused to just touch lightly against the end of the arm 289. In this position the microswitch 87 is open. When the arm 289 is slid longitudinally to the left to the position shown in Fig. 19, the end of the arm 289 pushes the microswitch 87 to closed position as shown in Fig. 19.

The operation of the microswitches 49 and 87 will now be reviewed in the light of the above description. A tabulate run is instituted by the actuation of the tabulator finger lever through the solenoid 93, as shown at 547 in Fig. 2b. At the institution of this tab operation the lever 297 pushes the arm 289 counterclockwise from the position shown in Fig. 16 to the position shown in Fig. 18. This corresponds to the stimulus line 548 in Fig. 2b and opens the microswitch 49. Thereafter the carriage starts its tabulating run as shown at 545.

As the tabulating run nears completion, a pre-set tabulating stop engages the finger 292 to push the lever 289 from the position shown in Fig. 18 to the position shown in Fig. 19. This corresponds to the stimulus line 551 in Fig. 2b. This action automatically releases the latch holding the arm 289 in counterclockwise position, and it immediately snaps clockwise. Simultaneously, the finger 292 is released from the tab stop by this oscillation, so that the offset arm 294 not only swings to the rear but also to the right, thereby rapidly moving from the position shown in Fig. 19 to that shown in Fig. 16. This opens the microswitch 87 and almost simultaneously re-closes the microswitch 49 as shown in Fig. 16. These two stimulus lines have for clarity been separated in Fig. 2b and shown as the lines 552 and 554. Almost at the same time the carriage is arrested following its tab run as shown in Fig. 2b. Thus a tabulating run is completed with its consequent actuation of the microswitches 49 and 87.

When the typewriter carriage 202 is tabulated over to the right-hand margin stop, the operation is substantially the same as above described except that the arm 289 is actuated by the engagement of the margin stop 303 with the lateral tab 293 on the arm 289. As before, the termination of this final tabulating run pushes the lever 289 to the left, which automatically releases it so that it snaps clockwise from the position shown in Fig. 19. It does not, however, slide back to the right, as in a tab release, because the stop 303 continues to bear against the lateral tab 293. Thus while the microswitch 49 is returned to closed position as shown at 587 in Fig. 2c, the microswitch 87 is not reopened but remains closed as shown at 592, until the carriage is returned to the right. This removes the stop 303 from the tab 293 and produces the opening of the microswitch shown at 596.

There will now be described the mounting and operation of the carriage return microswitches 109 and 57. These switches are illustrated in Figs. 20 through 23, wherein is illustrated in plan the right rear corner of the carriage frame.

Certain conventional operations will first be described before introducing a description of the microswitch mountings forming a part of the instant invention.

To the typewriter frame 287 is slidably mounted a link 306 having a hook 307 on the end thereof. The link 306 has a lateral tab 308 extending between the bifurcated arms 309 of a bell crank 311 pivoted to the typewriter frame 287 at 312. The other end of the bell crank 311 is engaged in a slot 313 in the upper arm of a second bell crank 314 pivoted at 316 to the frame. The depending arm 315 of the bell crank 314 actuates a push rod 317, which serves to interpose an interlock against the finger fleys on the typewriter panel so that no key can be depressed when the link 306 has been moved to the left. The link 306 is moved to the left by engagement of its hook 307 with a tab 318 extending laterally from the right-hand margin stop 303. Thus when the carriage has been moved to the left until it is blocked by the stop 303, all the typewriter panel buttons or keys are locked so that further typing is impossible.

When it is desired to return the carriage to the right, the carriage return button is pressed on the keyboard, and this starts in motion a carriage return cycle which, once started by depression of the carriage return key or button, carries through to completion. Upon institution of this carriage return cycle, a pull rod 319 (Fig. 20) is first pulled forward causing a bell crank 321 to pivot slightly clockwise. This transmits rightward motion to a lateral link 322 incorporated in the carriage return mechanism. When the carriage return button is once depressed so that a carriage return cycle is instituted, the bell crank 321 is moved to its clockwise position (Fig. 22) and remains there throughout the return run of the carriage. When the carriage has been returned to its right-hand position, the bell crank 321 snaps back to the counterclockwise position shown in Fig. 20.

The apparatus and operation described immediately above with respect to the key locking and carriage return links are conventional and form no part of the instant invention, except to constitute actuating media for the microswitches 109 and 57, which will now be described.

The microswitch 109 is mounted to the typewriter frame through the intermediacy of a bracket 323 and so disposed that the operating arm 324 of the switch bears lightly against the front edge of the depending arm 315 of the bell crank 314, as shown at 326. Thus as the carriage completes its final tab run, i. e., as it attains its extreme left-hand position, the right-hand margin stop 303 thereon engages the hook 307 to actuate the bell crank 314 counterclockwise in Fig. 21. This moves the arm 324 to close the microswitch 109 as shown at 581 in Fig. 2c. This occurs just slightly before operation of the microswitch 87 is effected by the arm 289 at the left-hand side of the frame, as shown at 586.

As explained hereinbefore in connection with Fig. 2c, closing of the microswitch 109 energizes the solenoid 111 to depress the carriage return button and institute a carriage return operation as shown at 584.

The microswitch 57 is mounted to a bracket 327 secured to the right side wall 328 of the typewriter frame. The actuating arm 329 of the microswitch 57 carries a roller 331 which normally bears against one end of one of the bell crank arms 321. In this normal or quiescent position the microswitch 57 is held closed, as shown in Fig. 1a.

Institution of a carriage return run brings about a forward motion of the link 319, pivoting the bell crank 321 clockwise to the position shown in Fig. 22. This movement frees the roller 331 and opens the microswitch 57, as shown at 593 in Fig. 2c. Immediately thereafter the carriage starts on its return run as shown at 594. The microswitch 57 remains open during the entire carriage return run because the bell crank 321 is in the clockwise position N (Fig. 22) during this entire interval. Upon completion of the run, the bell crank returns counterclockwise to the position shown in Fig. 20, and the microswitch 57 is re-closed, as shown at 606.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims.

What is claimed is:

1. Recording apparatus comprising in combination a typewriter having a plurality of type keys operable to type symbols, a registering machine having a plurality of ordinally arranged register elements, each register element having a plurality of positions corresponding to symbols which may be individually brought into registered position, a plurality of multi contact distributor switches mounted to said registering machine and operated by the respective register elements of the registering machine so as to be positioned by the positioning of the register elements, each distributor switch being operable to connect a first terminal thereof successively to other terminals thereof, said other terminals corresponding to the several positions of the register element associated with the distributor switch, a plurality of electrically energizable symbol actuators mounted to the typewriter and effective to actuate, respectively, certain typewriter keys to type symbols corresponding to the symbols of said register elements, the terminals on said distributor switches which correspond to a given symbol being electrically connected together and to the respective corresponding actuator, a stepping switch operable to connect one of its terminals successively with others of its terminals, said other terminals corresponding to the number of said distributor switches and register elements, circuit means electrically connecting said other terminals of said stepping switch, respectively, with said first terminals of said distributor switches, a first circuit, a second switch means in said first circuit, said stepping switch, distributor switches, and actuators being part of the first circuit adapted to be connected to a source of potential, whereby as said stepping switch is operated through its successive positions current flows successively through each distributor switch and through the particular actuator to which the distributor switch is positioned, thereby causing the corresponding typewriter keys to successively type the symbols registered by said register elements, said stepping switch having electrically energizable stepping means responsive to each discrete energization pulse applied thereto to operate said stepping switch to connect a next succeeding terminal thereof to said one terminal thereof, a second circuit including and controlling said stepping means and adapted to be connected to a source of potential, a first switch means in said second circuit, said first switch means being mounted to said typewriter, means for actuating said first switch means in response to a typing stroke of a typewriter key, whereby said first switch means and said stepping switch are operated successively with each stroke of a key.

2. Apparatus according to claim 1, including second switch means in said first circuit mounted to said typewriter, and means responsive to a stroke of a typewriter key for opening said second switch means before said first switch means is actuated, and for closing said second switch means after said first switch means is actuated, thereby precluding breaking of the actuator circuit by stepping of the stepping switch.

3. Recording apparatus comprising in combination a typewriter having a plurality of type keys operable to type symbols, a registering machine having a plurality of ordinally arranged register elements, each register element having a plurality of positions corresponding to symbols which may be individually brought into registered position, a plurality of multi contact distributor switches mounted on said registering machine and operable by the respective register elements of the registering machine so as to be positioned by the positioning of the register elements, each distributor switch being operable to connect a first terminal thereof successively to other terminals thereof, said other terminals corresponding to the several positions of the register element, a plurality of electrically energizable actuators mounted to the typewriter and effective to actuate, respectively, certain typewriter keys to type symbols corresponding to the symbols of said register elements, the terminals of said distributor switches which correspond to a given symbol being electrically connected together and to the respective corresponding actuator, a stepping switch operable to connect one of its terminals successively with others of its terminals, said other terminals corresponding to the number of said distributor switches and register elements, first circuit means electrically connecting said other terminals of said stepping switch, respectively, with said first terminals of said distributor switches, said stepping switch, distributor switches, and actuators being part of a first circuit adapted to be connected to a source of potential, whereby as said stepping switch is operated through its successive positions current flows successively through each distributor switch and through the particular actuator to which the distributor switch is positioned, thereby causing the corresponding typewriter keys to successively type the registered symbols, said stepping switch having electrically energizable stepping means responsive to each discrete energization pulse applied thereto to operate said stepping switch to connect a next succeeding terminal thereof to said one terminal thereof, a second circuit including said stepping means and adapted to be connected to a source of potential, first switch means in said second circuit mounted to said typewriter, means for closing said first switch means in response to a forward typing stroke of a typewriter key and for opening said first switch means in response to a retracting stroke of the key, whereby said stepping switch is operated successively with each stroke of a key, second switch means in said first circuit mounted to said typewriter, and means responsive to a forward typing stroke of a key for opening said second switch means before said first switch means is closed, and responsive to a retracting stroke of the key for closing said second switch means after said first switch means is opened, thereby precluding breaking of the actuator circuit by stepping of the stepping switch.

4. Apparatus according to claim 3, including a plurality of multi contact function switches corresponding in number to said distributor switches, each said function switch being effective to connect a first terminal thereof selectively with one of other terminals thereof, said plurality of function switches forming part of said first circuit, a punctuation actuator mounted to said typewriter and effective to actuate a punctuation key, punctuation switch means, and a third circuit including said punctuation switch means and connecting said punctuation actuator to be energized when a function switch is disposed in a predetermined position.

5. Apparatus according to claim 4, wherein said third circuit includes punctuation relay means connected to apply energy from said function switches selectively to said punctuation actuator or to a selected one of said distributor switches, and including punctuation relay actuator means connected to be energized from said function switches, switch means connected to energize said punctuation relay actuator means and mounted to said typewriter to be actuated by the stroke of a typewriter key, whereby when any given function switch is disposed in the punctuation position the punctuation actuator is first energized to effect the typing of a punctuation mark, the punctuation relay actuator means is energized to operate the relay to apply energy to said selected distributor switch, and the symbol key to which said selected distributor switch is positioned is then actuated.

6. Apparatus according to claim 4 wherein said third circuit includes the first contact of a punctuation relay having first contact, second contact and an acuator, said relay actuator being connected to corresponding terminals of the function switches, a circuit for energizing said relay actuator and including switch means mounted to and actuable by said typewriter to actuate said punctuation relay after said punctuation key has been actuated, actuation of said punctuation relay serving to open the first contact thereof and to close the second contact thereof, said stepping switch having a second bank of contacts including a common terminal connected to said second contact of said punctuation relay, the other contacts of said second bank being connected to the respective first terminals of said distributor switches, whereby after typing of the punctuation, a symbol actuator is energized through said second bank to type a particular symbol, and switch means in said second circuit mounted to said typewriter to be opened by the stroke of said punctuation key, whereby said stepping switch is prevented from being stepped by said punctuation key stroke.

7. Apparatus according to claim 6, including a back-circuit-preventing rectifier interposed in the circuit of said punctuation actuator and said second bank, and wherein said punctuation relay includes holding-in contacts connected in shunt around said punctuation-relay-actuating switch means.

8. Apparatus according to claim 3, including a plurality of multi contact function switches, each effective to connect a first terminal thereof selectively with one of the other terminals thereof, said plurality of function switches forming part of the respective said first circuit means, a tabulator actuator mounted to said typewriter and effective to initiate tabulating movement of the typewriter carriage, and second circuit means connecting said tabulator actuator to be energized when a function switch is disposed in a predetermined position.

9. Apparatus according to claim 8 wherein said second circuit means includes a tabulator relay connected to apply energy from said function switches selectively to said tabulator actuator or to a selected one of said distributor switches, and including a relay actuator connected to be energized from said function switches, switch means connected to energize said tabulator relay actuator and mounted to said typewriter to be operated by said typewriter near the end of the tabulator run of the typewriter carriage, switch means connected to de-energize said tabulator actuator and mounted to said typewriter to be operated at the start and at the finish of said tabulator run, whereby when any given function switch is disposed in the tabulator position, the tabulator actuator is first energized to start a carriage tabulator run, the tabulator actuator is de-energized, the tabulator relay actuator is energized to apply energy to said selected distributor switch, and the symbol key to which said selected distributor switch is positioned is then actuated.

10. Apparatus according to claim 3, including a plurality of multi-contact function switches corresponding in number to said distributor switches, each said function switch being effective to connect a first terminal thereof selectively with one of the other terminals thereof, said plurality of function switches forming part of the respective first circuit means, and second circuit means connecting said stepping means to said function switches to be energized through said stepping switch when a function switch is disposed in a predetermined position.

11. Apparatus according to claim 1 wherein said typewriter includes means for returning the carriage, and including a carriage return actuator effective to initiate return of the typewriter carriage, switch means effective to energize said carriage return actuator and mounted to said typewriter to be operated when the carriage reaches the end of its run, and carriage return safety switch means connected in said first circuit in series with said second switch means and mounted to said typewriter to deenergize said first circuit during the return run of the carriage, thereby precluding the operation of any type key during the return run of the carriage.

12. Apparatus according to claim 1, including starting switch means in said second circuit mounted to said registering machine to be actuated by the completion of a registration, whereby said stepping switch is started on its stepping cycle upon termination of a setting of said registers.

13. Apparatus according to claim 1, including an identifying symbol actuator mounted to said typewriter to actuate, upon being energized, an identifying symbol type key, circuit means connecting said identifying symbol actuator to be energized through a contact of said stepping switch, and switch means mounted to said registering machine and interposed in said last named circuit means, the setting of said last named switch means determining whether or not said identifying symbol is typed.

14. Apparatus for causing a typewriter to type symbols corresponding to symbols on ordinally arranged register elements in a registering machine, comprising in combination a plurality of multi contact distributor switches, each operable to connect a first terminal thereof successively to other terminals thereof, there being one distributor switch for each said register element, each said register element having a plurality of positions corresponding to symbols which may be individually brought into registered position, each said distributor switch being adapted to be operated into position corresponding to the position of its respective register element, a plurality of electrically energizable actuators adapted to actuate respectively the typewriter keys corresponding to the symbols of said register elements, corresponding terminals on said distributor switches being electrically connected together and to the respective corresponding actuators, a stepping switch operable to connect one of its terminals successively with others of its terminals, said other terminals corresponding to said distributor switches and said register elements, circuit means electrically connecting said other terminals of said stepping switch, respectively, with said first terminals of said distributor switches, said stepping switch, distributor switches, and actuators being part of a first circuit adapted to be connected to a source of potential, whereby as said stepping switch is operated through its successive positions, current flows successively through each distributor switch and through the particular actuator to which the distributor switch is positioned, thereby causing the corresponding typewriter keys to successively type the registered symbols, said stepping switch having electrically energizable stepping means responsive to each discrete energization pulse applied thereto to operate said stepping switch to connect a next succeeding terminal thereof to said one terminal thereof, a second circuit including said stepping means and adapted to be connected to a source of potential, switch means in said second circuit adapted to be mounted to the typewriter, and means responsive to a typing stroke of a typewriter key for actuating said switch means, whereby said stepping switch is operated successively with each stroke of a typewriter key.

15. Recording apparatus comprising in combination: a typewriter having a plurality of type keys operable to type symbols, a registering machine having a plurality of register elements, each register element having a plurality of positions corresponding to symbols which may be individually brought into registered position, first electrical control means operating to actuate the typewriter keys in accordance with the positions of said register elements, said first control means including step-by-step operating switch means for successively connecting each of said register elements to said typewriter to read out the symbols registered by said registering machine, stepping means within said step-by-step operating switch means and second electrical control means controlled by operation of said keys and effective to control said stepping means to step said switch means, to connect a next succeeding register element to said typewriter.

16. Apparatus according to claim 15, including function switch means selectively operable to effect operation of a type key independently of a register means.

17. Apparatus according to claim 15, including function switch means selectively operable to effect operation of a type key independently of a register means and to prevent stepping of said step-by-step operating switch means by said last mentioned key operation.

18. In a combined typewriter and calculating machine for calculating amounts and typing the calculated amounts, said typewriter having numeral type keys, electrical control means operating to actuate said keys, step-by-step operating switch means operable to step from one position to a succeeding position and effective to control operation of said electrical means in accordance with the amounts calculated in the calculating machine, period typing means in said typewriter operable to type a period between typed numerals, and function switch means operable to control said step-by-step operating switch means to permit typing of a period by said period typing means without stepping of said step-by-step operating switch means for one position to a succeeding position.

19. Apparatus for causing a typewriter to type symbols from a symbol storage apparatus, said symbol storage apparatus including a plurality of ordinally arranged rotary registering elements, each having a plurality of attitudes corresponding to symbols stored by said storage apparatus, comprising in combination: a plurality of multi-contact distributor switches, each operable to connect a first terminal thereof successively to other terminals thereof, there being one distributor switch for each storage means which is to be read out and typed by the typewriter, each said distributor switch being adapted to be operated into position corresponding to the attitude of its respective storage means, a plurality of electrically energizable actuators adapted to actuate, respectively, the typewriter keys corresponding to the symbols of said storage apparatus, corresponding terminals on said distributor switches being electrically connected together, and to the respective corresponding actuators, a stepping switch operable to connect one of its terminals successively with others of its terminals, said other terminals corresponding to said distributor switches and storage means, circuit means electrically connecting said other terminals of said stepping switch, respectively, with said first terminals of said distributor switches, said stepping switch, distributor switches, and actuators being part of a first circuit adapted to be connected to a source of potential, whereby as said stepping switch is operated through its successive positions, current flows successively through each distributor switch and through the particular actuator to which the distributor switch is positioned, thereby causing the corresponding typewriter keys to successively type the stored symbols, said stepping switch having electrically energizable stepping means responsive to each discrete energization pulse applied thereto to operate said stepping switch to connect a next succeeding terminal thereof to said one terminal thereof, a second circuit including said stepping means and adapted to be connected to a source of potential, switch means in said second circuit adapted to be mounted to the typewriter, and rod means common to said typewriter keys and responsive to a typing stroke of a typewriter key for actuating said switch means, whereby said stepping switch is operated successively with each stroke of a typewriter key.

References Cited in the file of this patent

UNITED STATES PATENTS

| | | |
|---|---|---|
| 1,942,106 | Kottmann | Jan. 2, 1934 |
| 1,998,355 | Boutet | Apr. 16, 1935 |
| 2,084,445 | Kottmann | June 22, 1937 |
| 2,236,792 | Furber | Apr. 1, 1941 |
| 2,262,235 | Hofgaard | Nov. 11, 1941 |
| 2,403,005 | Lake et al. | July 2, 1946 |
| 2,493,709 | Wittenmyer | Jan. 3, 1950 |
| 2,551,093 | Bryce et al. | May 1, 1951 |

FOREIGN PATENTS

| | | |
|---|---|---|
| 219,309 | Switzerland | June 16, 1942 |